US009652856B2

(12) United States Patent
Takenaka

(10) Patent No.: US 9,652,856 B2
(45) Date of Patent: May 16, 2017

(54) IMAGE PROCESSING SYSTEM, IMAGE PROCESSING APPARATUS, AND IMAGE CAPTURING SYSTEM

(71) Applicant: Hirokazu Takenaka, Kanagawa (JP)

(72) Inventor: Hirokazu Takenaka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/812,061

(22) Filed: Jul. 29, 2015

(65) Prior Publication Data

US 2016/0048973 A1 Feb. 18, 2016

(30) Foreign Application Priority Data

Aug. 12, 2014 (JP) ................................. 2014-164375

(51) Int. Cl.
*G06K 9/36* (2006.01)
*H04N 7/00* (2011.01)
(Continued)

(52) U.S. Cl.
CPC .......... *G06T 7/0097* (2013.01); *G06K 9/6202* (2013.01); *G06T 3/0018* (2013.01);
(Continued)

(58) Field of Classification Search
CPC ....... G06T 7/0097; G06T 5/50; G06T 7/0083; G06T 3/0018; G06T 7/0085;
(Continued)

(56) References Cited

U.S. PATENT DOCUMENTS 5,986,668 A 11/1999 Szeliski et al.
6,701,030 B1 3/2004 Uyttendaele et al.
(Continued)

FOREIGN PATENT DOCUMENTS

JP 10-178564 6/1998
JP 11-308608 A 11/1999
(Continued)

OTHER PUBLICATIONS

U.S. Appl. No. 14/419,556, filed Feb. 4, 2015.
(Continued)

*Primary Examiner* — Sheela C Chawan
(74) *Attorney, Agent, or Firm* — Oblon, McClelland, Maier & Neustadt, L.L.P.

(57) ABSTRACT

An image processing system includes an image receiver to receive a first image sequence composed of first partial images and a second image sequence composed of second partial images captured at a plurality of time points, each one of the first partial images and corresponding each one of the second partial images captured at substantially the same time point, a detection unit to detect a stitching position of each one of the first partial images and corresponding each one of the second partial images captured at substantially the same time point, a correction unit to correct the stitching position at the plurality of time points, and an image synthesis processing unit to synthesize each one of the first partial images and corresponding each one of the second partial images captured at substantially the same time point based on the corrected stitching position information to generate a plurality of synthesis images.

13 Claims, 20 Drawing Sheets

(51) Int. Cl.

| | |
|---|---|
| *H04N 5/228* | (2006.01) |
| *G06T 7/00* | (2017.01) |
| *G06T 3/40* | (2006.01) |
| *H04N 5/232* | (2006.01) |
| *H04N 5/341* | (2011.01) |
| *G06K 9/62* | (2006.01) |
| *G06T 3/00* | (2006.01) |
| *G06T 5/50* | (2006.01) |
| *H04N 5/247* | (2006.01) |
| *H04N 5/335* | (2011.01) |
| *H04N 5/262* | (2006.01) |
| *G06T 7/38* | (2017.01) |
| *G06T 7/73* | (2017.01) |
| *G06T 7/12* | (2017.01) |
| *G06T 7/13* | (2017.01) |
| *G06T 7/174* | (2017.01) |
| *H04N 13/00* | (2006.01) |

(52) U.S. Cl.
CPC ............. *G06T 3/4038* (2013.01); *G06T 5/50* (2013.01); *G06T 7/12* (2017.01); *G06T 7/13* (2017.01); *G06T 7/174* (2017.01); *G06T 7/38* (2017.01); *G06T 7/73* (2017.01); *H04N 5/23238* (2013.01); *H04N 5/247* (2013.01); *H04N 5/2628* (2013.01); *H04N 5/335* (2013.01); *H04N 5/3415* (2013.01); *G06T 2200/32* (2013.01); *G06T 2207/10016* (2013.01); *G06T 2207/10021* (2013.01); *G06T 2207/20021* (2013.01); *G06T 2207/20182* (2013.01); *H04N 2013/0088* (2013.01)

(58) Field of Classification Search
CPC ... G06T 7/0042; G06T 3/4038; G06T 7/0038; H04N 5/2628; H04N 5/335; H04N 5/247; H04N 5/3415; H04N 5/23238; G06K 9/6202
USPC ............. 382/199, 138, 284, 312, 100, 137; 348/36, 38, 222.1, 207.1; 715/838
See application file for complete search history.

(56) References Cited

U.S. PATENT DOCUMENTS

| | | |
|---|---|---|
| 2004/0001138 A1* | 1/2004 | Weerashinghe ... H04N 13/0242 348/36 |
| 2006/0083440 A1 | 4/2006 | Chen |
| 2006/0115181 A1 | 6/2006 | Deng et al. |
| 2013/0028582 A1* | 1/2013 | Batur ..................... G03B 13/36 396/124 |
| 2013/0057542 A1 | 3/2013 | Takenaka et al. |
| 2013/0113892 A1* | 5/2013 | Nakamaru ............. G03B 35/18 348/47 |
| 2013/0235149 A1 | 9/2013 | Tanaka et al. |
| 2014/0036031 A1 | 2/2014 | Tanaka et al. |
| 2014/0071227 A1 | 3/2014 | Takenaka et al. |
| 2014/0078247 A1 | 3/2014 | Shohara et al. |
| 2014/0152852 A1 | 6/2014 | Ito et al. |
| 2014/0176542 A1 | 6/2014 | Shohara et al. |
| 2015/0042647 A1 | 2/2015 | Shohara et al. |
| 2015/0062363 A1 | 3/2015 | Takenaka et al. |

FOREIGN PATENT DOCUMENTS

| | | |
|---|---|---|
| JP | 2004-186922 A | 7/2004 |
| JP | 2005-223487 | 8/2005 |
| JP | 2006-135386 | 5/2006 |
| JP | 2010-21897 | 1/2010 |
| JP | 2012-43151 | 3/2012 |
| JP | 2015-046044 | 3/2015 |

OTHER PUBLICATIONS

Extended European Search Report issued Mar. 8, 2016 in Patent Application No. 15179649.7.
Sarp Ertürk, "Image sequence stabilization by low-pass filtering of interframe motion" Proceedings of SPIE, vol. 4310, XP055242241, 2001, pp. 434-442.
Notification of Reason(s) for Refusal mailed Jul. 21, 2015, in Japanese Patent Application No. 2014-164357 (with English-language Translation).
Office Action issued Oct. 18, 2016 in Japanese Patent Application No. 2015-227337.

* cited by examiner

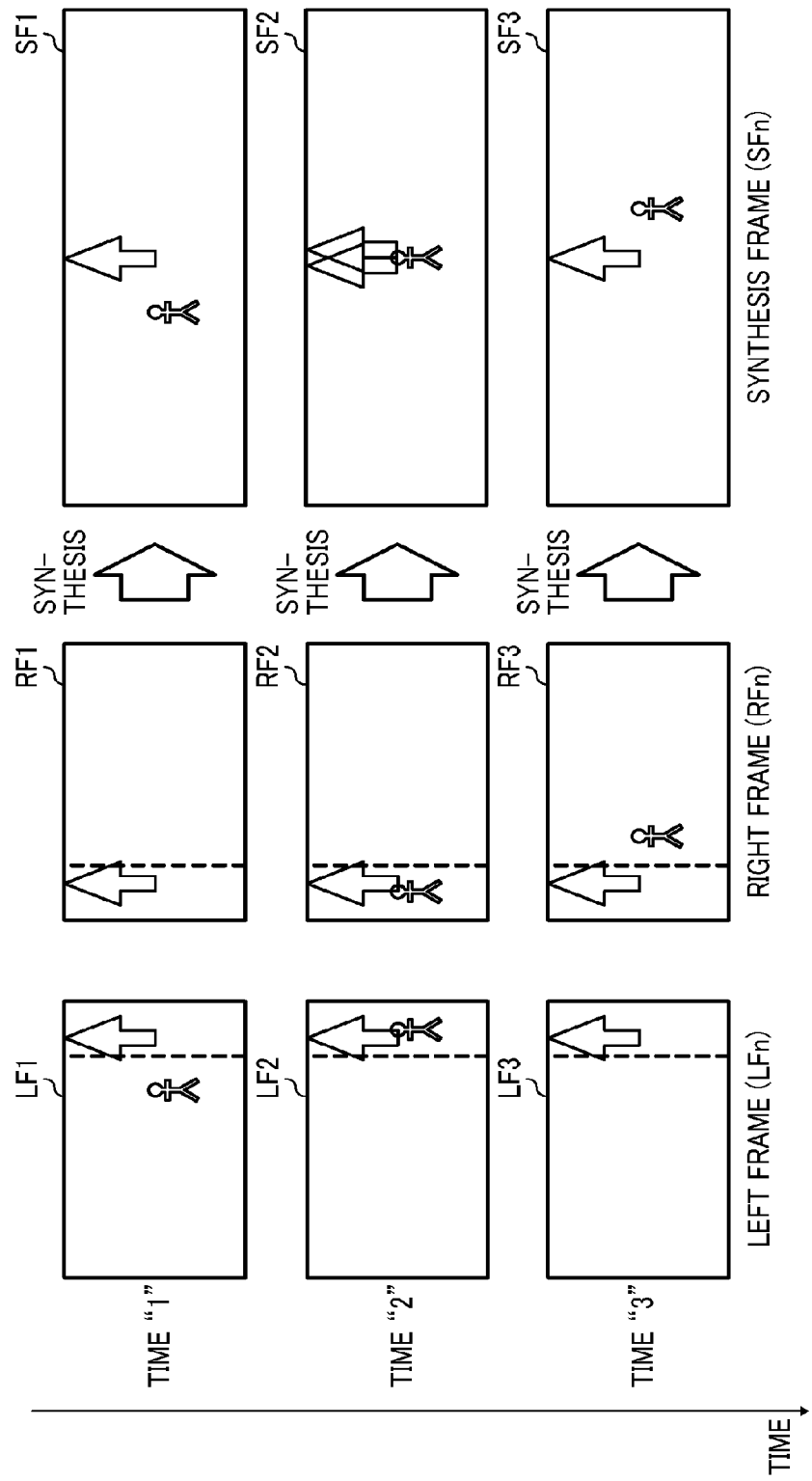

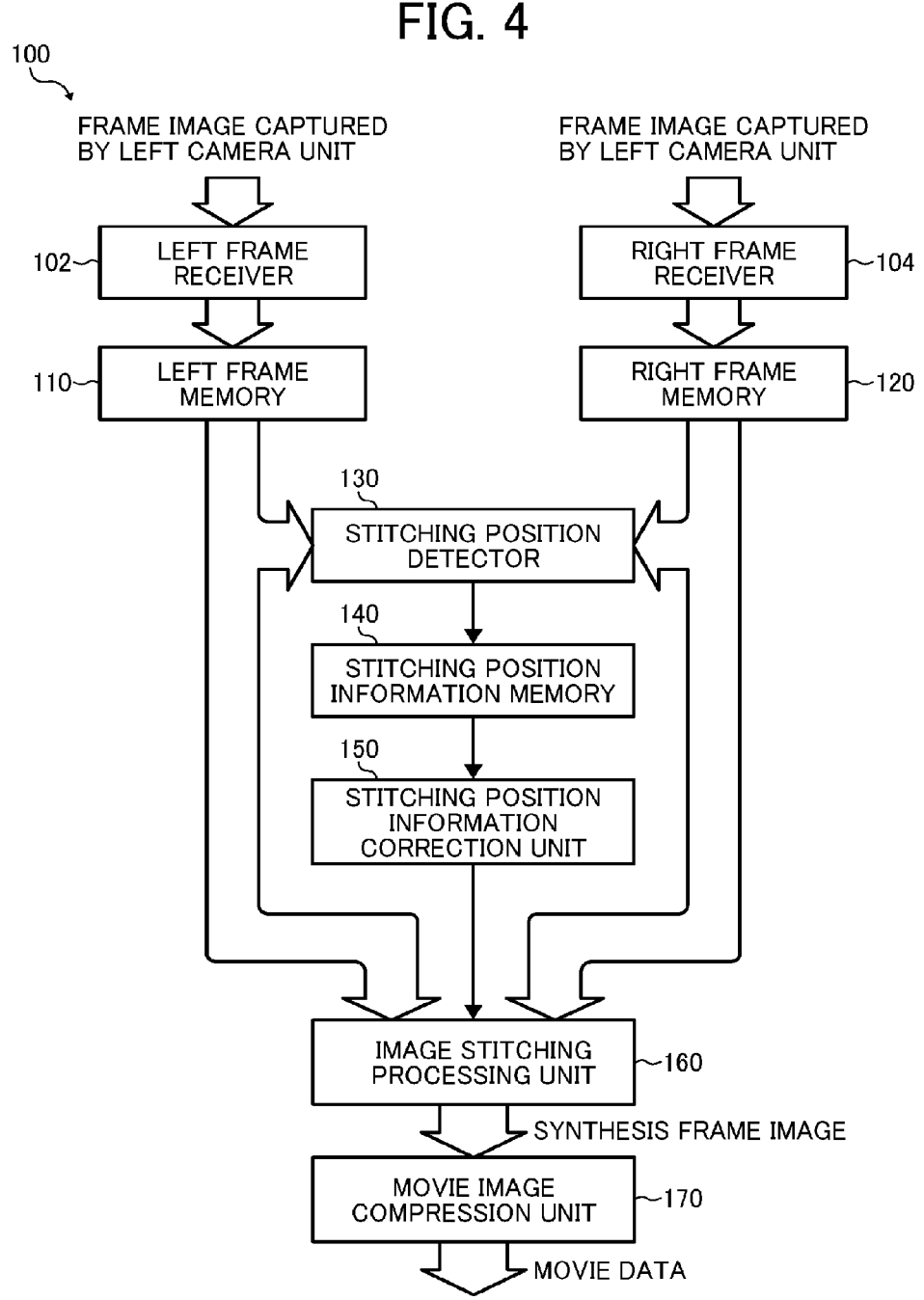

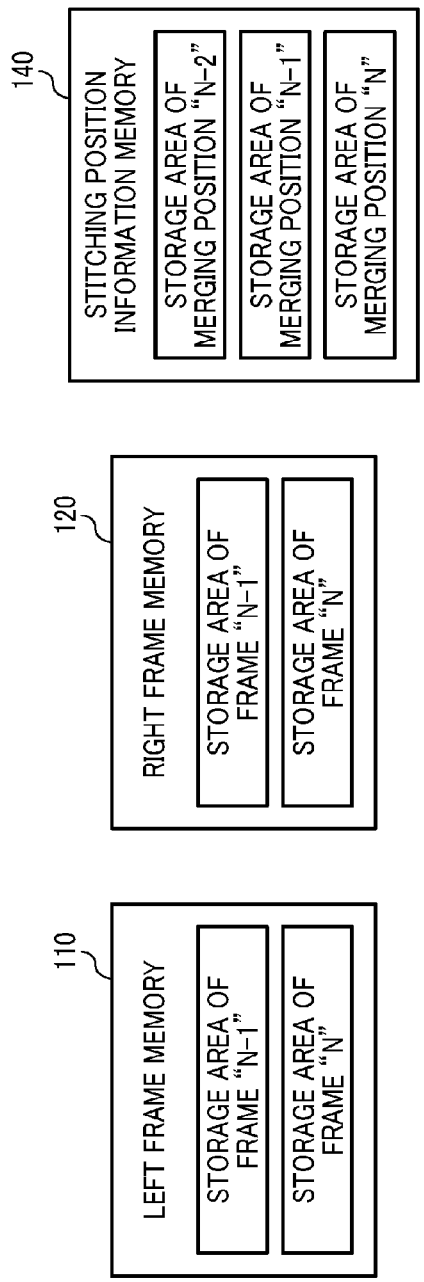
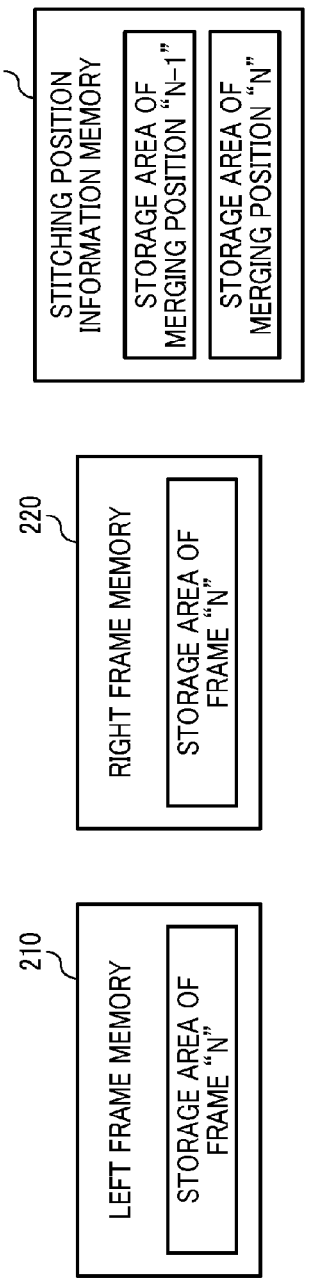

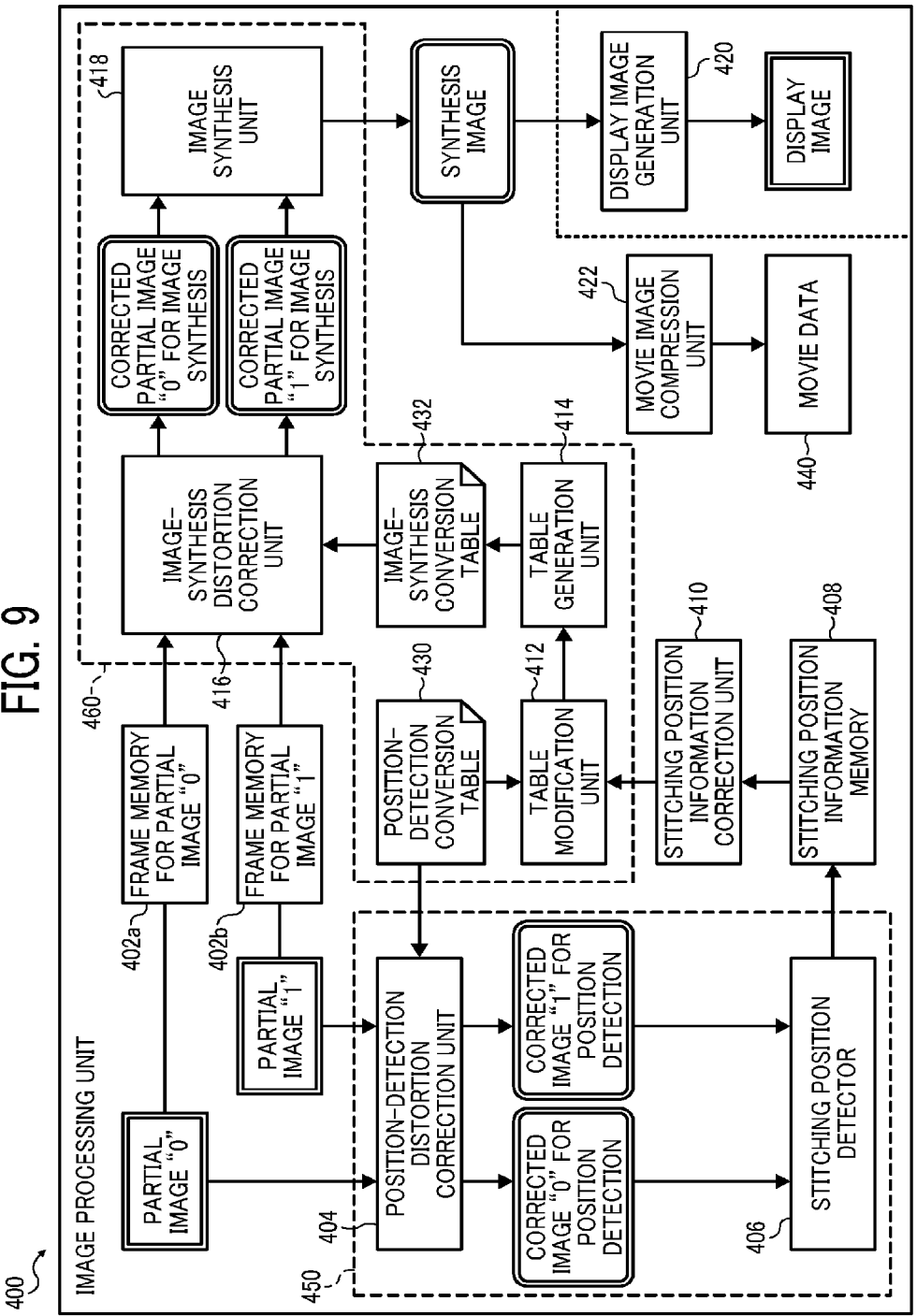

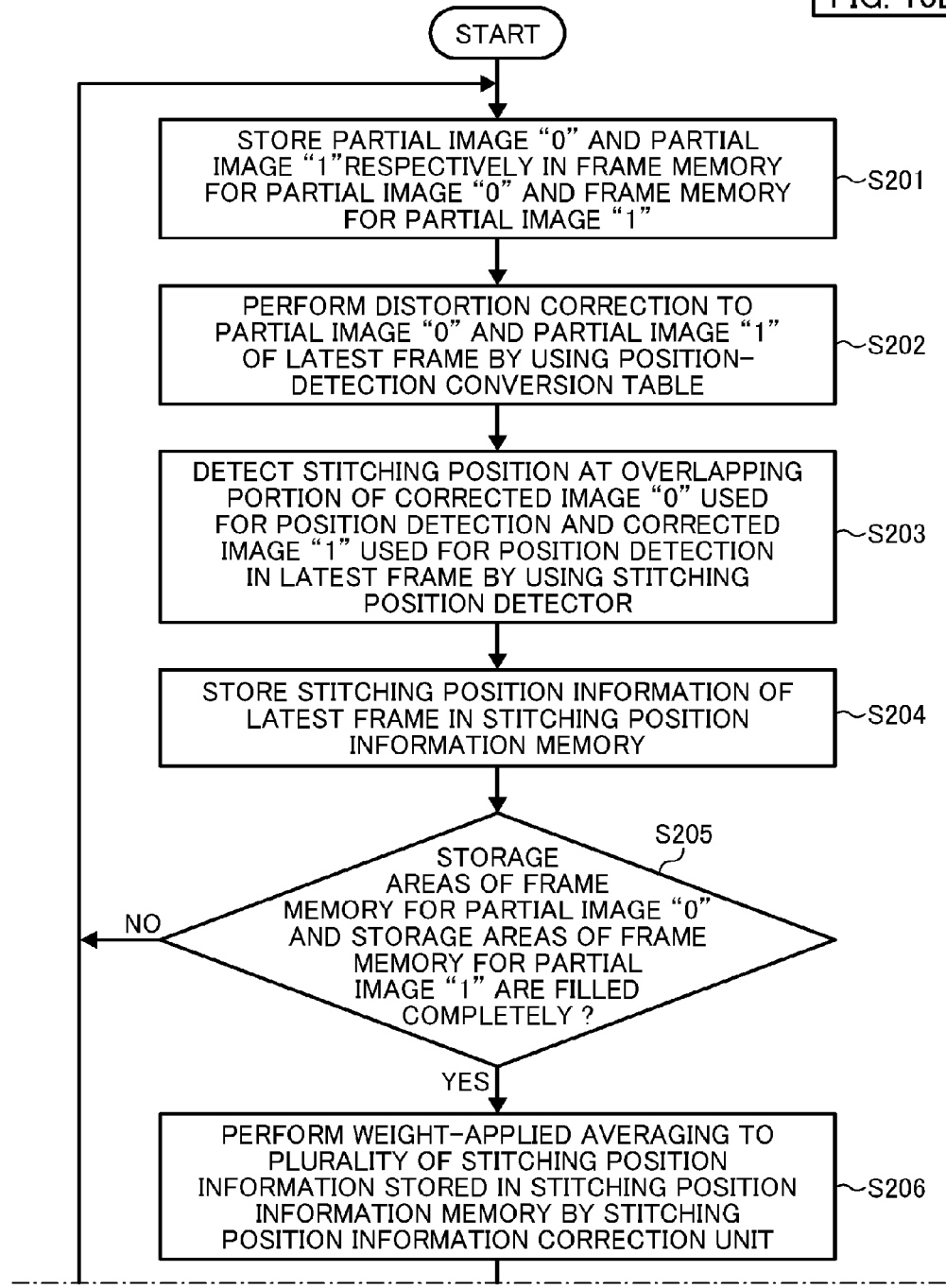

| COORDINATES AFTER CONVERSION | | COORDINATES BEFORE CONVERSION | |
|---|---|---|---|
| θ (pix) | φ (pix) | x (pix) | y (pix) |
| 0 | 0 | | |
| 1 | 0 | | |
| ⋮ | ⋮ | ⋮ | ⋮ |
| 3598 | 1799 | | |
| 3599 | 1799 | | |

FIG. 16

| COORDINATES AFTER CONVERSION | | STITCHING POSITION (DEVIATION AMOUNT) | |
|---|---|---|---|
| $\theta$ (pix) | $\phi$ (pix) | $\Delta\theta$ (pix) | $\Delta\phi$ (pix) |
| 0 | 0 | | |
| 1 | 0 | | |
| ⋮ | ⋮ | ⋮ | ⋮ |
| 3598 | 1799 | | |
| 3599 | 1799 | | |

IMAGE PROCESSING SYSTEM, IMAGE PROCESSING APPARATUS, AND IMAGE CAPTURING SYSTEM

This application claims priority pursuant to 35 U.S.C. §119(a) to Japanese Patent Application No. 2014-164375, filed on Aug. 12, 2014 in the Japan Patent Office, the disclosure of which are incorporated by reference herein in their entirety.

BACKGROUND

Technical Field

The present invention relates to an image processing system, an image processing apparatus, a storage medium or carrier medium, and an image capturing system, and more particularly to an image processing system, an image processing apparatus, a storage medium or carrier medium, and an image capturing system that synthesizes a plurality of image sequences, each image sequence composed of a plurality of partial images.

Background Art

Conventionally, one image capturing device (e.g., camera) employing a lens having a given angle of view captures images for a plurality of times, and stitches the captured images to generate a wide-angle image having the angle of view greater than the angle of view of the one image capturing device. Further, a plurality of camera units capture images at the same time, and stitch the captured images to generate a wide-angle image having the angle of view greater than the angle of view of the one image capturing device. For example, hemispherical photography camera system is known. By using the hemispherical photography camera system, a hemispherical photographed image, which is an all-around direction image, can be captured. Since the hemispherical photographed image cannot be captured by one-time image shooting using a wide angle lens, images are captured for a plurality of times by one camera or images are captured by using a plurality of cameras at the same time, and then stitched to generate the hemispherical photographed image.

The images can be stitched by applying a pattern matching to an overlapping portion between the captured images, in which a position of a captured object is detected, and the images are stitched based on the detected position. Conventionally, the image stitching technologies are developed mainly for still images. Although some image stitching technologies are developed for movie images, the image stitching is performed by assuming each of frame images captured at the same point in time as a still image.

When the above mentioned conventional image stitching technologies are applied to movie images (i.e., a time series of sequential images), an object may be seen as discontinued images in the movie image between the frames composing the movie image. For example, when the movie image is replayed, an object at the stitching portion may be seen as a discontinuing image in the movie image composed of synthesis frame images, with which quality of movie image deteriorates.

JP-2006-135386-A discloses the image stitching technologies for movie images that can generate one panorama movie image from movie images captured by a plurality of cameras at high speed. Specifically, a positional deviation between a pluralities of partial images is computed for the beginning frame, and a positional deviation between the previous frame and the post frame is computed for the next and subsequent frames to compute positional deviations between a pluralities of synthesis images of the movie images at high speed. Although the positional deviations between the plurality of synthesis images of the movie images is computed based on the frame-to-frame relationship in appearance, the positional deviation is computed for each of the plurality of frames separately, and thereby the frame-to-frame positional relationship of an object (e.g., smooth movement of object from one frame to another frame) may not be set effectively for the movie images.

SUMMARY

In one aspect of the present invention, an image processing system is devised. The image processing system includes an image receiver to receive a first image sequence composed of first partial images captured at a plurality of time points, and a second image sequence composed of second partial images captured at the plurality of time points, each one of the first partial images and corresponding each one of the second partial images captured at substantially the same time point, a detection unit to detect a stitching position of each one of the first partial images and corresponding each one of the second partial images captured at substantially the same time point for the plurality of time points, a correction unit to correct the stitching position at the plurality of time points detected by the detection unit, an image synthesis processing unit to synthesize each one of the first partial images and corresponding each one of the second partial images captured at substantially the same time point based on the stitching position information corrected by the correction unit for the plurality of the first and second partial images to generate a plurality of synthesis images.

In another aspect of the present invention, an image processing apparatus is devised. The image processing apparatus includes an image receiver to receive a first image sequence composed of first partial images captured at a plurality of time points, and a second image sequence composed of second partial images captured at the plurality of time points, each one of the first partial images and corresponding each one of the second partial images captured at substantially the same time point, a detection unit to detect a stitching position of each one of the first partial images and corresponding each one of the second partial images captured at substantially the same time point for the plurality of time points, a correction unit to correct the stitching position at the plurality of time points detected by the detection unit, and an image synthesis processing unit to synthesize each one of the first partial images and corresponding each one of the second partial images captured at substantially the same time point based on the stitching position information corrected by the correction unit for the plurality of the first and second partial images to generate a plurality of synthesis images.

In another aspect of the present invention, an image capturing system is devised. The image capturing system includes a first image capturing device including a lens optical unit and a solid state image sensor, a second image capturing device including a lens optical unit and a solid state image sensor, each of the image capturing devices capturing different directions, an image receiver to receive a first image sequence composed of first partial images captured at a plurality of time points captured by the first image capturing device, and a second image sequence composed of second partial images captured at the plurality of time points captured by the second image capturing device, each one of the first partial images and corresponding each one of the second partial images captured at substantially the same time point, a detection unit to detect a stitching position of each one of the first partial images and corresponding each one of the second partial images captured at substantially the same time point for the plurality of time points, a correction unit to correct the stitching position at the plurality of time points detected by the detection unit, and an image synthesis processing unit to synthesize each one of the first partial images and corresponding each one of the second partial images captured at substantially the same time point based on the stitching position information corrected by the correction unit for the plurality of the first and second partial images to generate a plurality of synthesis images.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 3 illustrates a conventional process of stitching a plurality of frames composing a movie image, which may have some problems;

FIG. 4 illustrates a functional block for stitching a plurality of frames composing a movie image with data flow according to a first example embodiment;

FIG. 5A illustrates a detail of each of frame memories according to a first example embodiment;

FIG. 5B illustrates a detail of each of frame memories of a variant configuration according to a first example embodiment;

FIG. 9 illustrates an image processing unit of the hemispherical image capturing device for generating a hemispherical image;

FIG. 10A and 10B are a flowchart showing the steps of generating a hemispherical movie image performable by the hemispherical image capturing device according to a second example embodiment;

FIG. 16 is an example of a data structure of a corrected stitching position table including corrected stitching position for each of pixels, which is generated before modifying a position-detection conversion table according to the second example embodiment;

Figure 1:
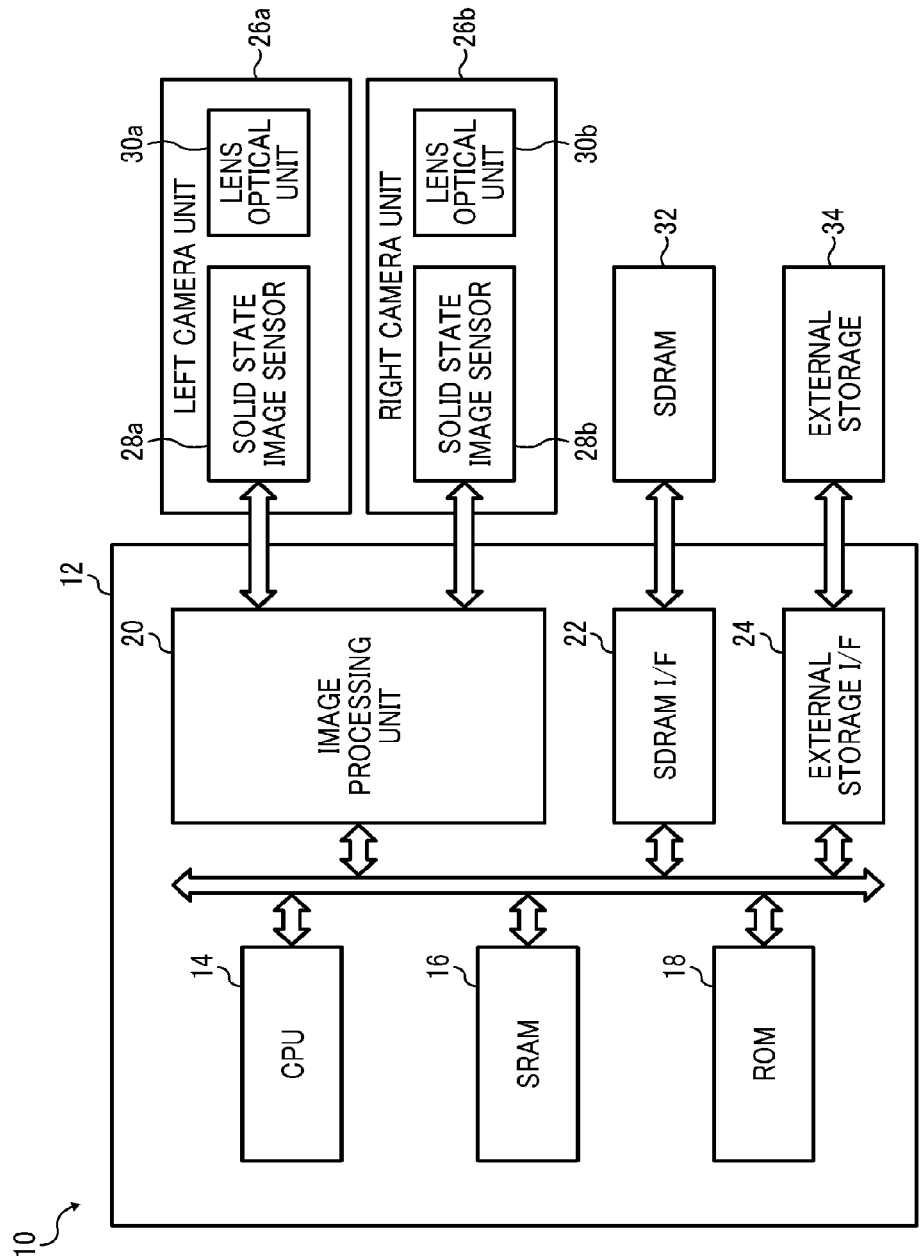
FIG. 1 is a hardware configuration of an image capturing apparatus according to a first example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, one or more apparatuses or systems according to one or more example embodiments are described hereinafter.

A description is given of an image processing system, an image processing apparatus, and an image capturing system according to one or more example embodiments with reference to drawings. In this description, the image processing system, image processing apparatus, and image capturing system can include, for example, two sets of optical imaging systems, in which each optical imaging system includes a lens optical unit and a solid state image sensor, and the image processing system, image processing apparatus, and image capturing system can stitch images captured by the two optical imaging systems as synthesis images that composed a movie image.

(First Example Embodiment)

FIG. 1 is a hardware configuration of an image capturing apparatus 10 according to the first example embodiment, which includes two optical imaging systems. The image capturing apparatus 10 includes a controller 12. The controller 12 includes, for example, a central processing unit (CPU) 14, a static random access memory (SRAM) 16, a read only memory (ROM) 18, an image processing unit 20, a synchronous dynamic random access memory (SDRAM) interface (I/F) 22, and an external storage interface (I/F) 24. The controller 12 can be devised as one or more processing circuit or circuitry.

The CPU 14 controls each of units in the image capturing apparatus 10. The SRAM 16 is used as a storage area for performing image processing. The ROM 18 stores coded data of control programs and various parameters readable by the CPU 14.

The image capturing apparatus 10 further includes, for example, a plurality of camera units 26, in which each of the camera units 26 includes a solid state image sensor 28 and a lens optical unit 30. The plurality of camera units 26 connected to the controller 12 to input image data to the image processing unit 20. The solid state image sensor 28 can employ a charge coupled device (CCD) sensor, a complementary metal oxide semiconductor (CMOS) sensor, or the like. A combination of the solid state image sensor 28 and the lens optical unit 30 may be referred to the optical imaging system. In an example of FIG. 1, the two camera units 26 such as a left camera unit 26a and a right camera unit 26b are disposed as image capturing devices. The solid state image sensor 28 can be controlled by control commands from the CPU 14 in the controller 12.

A plurality of images captured by the two lens optical units 30a and 30b are respectively processed by the solid state image sensors 28a and 28b to generate a plurality of image data. The image processing unit 20 sequentially performs white balance processing and gamma correction processing to the plurality of image data input from the solid state image sensors 28a and 28b. Then, the plurality of image data (e.g., image data input from the solid state image sensors 28a and 28b) are sequentially synthesized as a plurality of synthesis images. The synthesis image may be also referred to synthesis image frame. The image processing unit 20 includes, for example, a codec block that performs movie compression and de-compression by applying H.264, with which the image processing unit 20 can encode the plurality of synthesis images as one movie image, and perform the movie compression.

The image capturing apparatus 10 further includes a SDRAM 32 connectable to the SDRAM interface (I/F) 22 connected to the controller 12. The image capturing apparatus 10 further includes an external storage 34 such as a memory connectable to the external storage interface (I/F) 24 connected to the controller 12. Further, sensors such as an accelerometer can be connected to the controller 12 via an external sensor interface.

When power supply is turned ON, the control program stored in the ROM 18 is loaded to a main memory. The CPU 14 controls operations at each of units in the image capturing apparatus 10 using the program loaded to the main memory, and temporary stores data required for controlling each of units in the SRAM 16 and/or SDRAM 32. With this configuration, to be described later, various processing and functions (or capabilities) to be described later can be devised.

When capturing a movie image, image data digitized by the solid state image sensors 28a and 28b are input to the image processing unit 20 of the controller 12 at the same timing for each of frames. Then, the input image data receives the image processing by the image processing unit 20, the CPU 14, the SRAM 16, and the SDRAM 32 for each of frames, and then the processed image data is stored in the external storage 34 with a movie data format.

Figure 2:
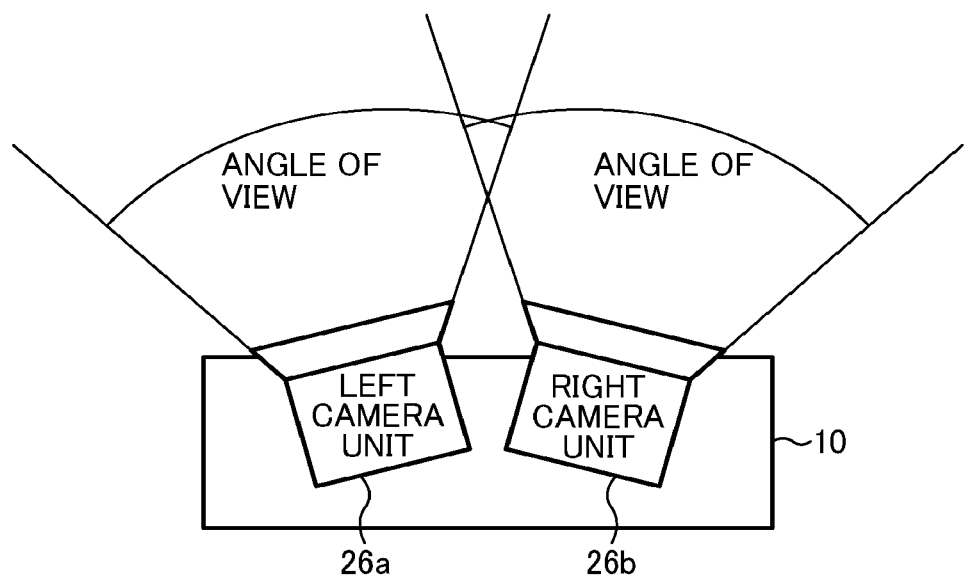
FIG. 2 is an example of an arrangement pattern of camera units of the image capturing apparatus of FIG. 1.

FIG. 2 is an example of an arrangement pattern of the camera units 26 of the image capturing apparatus 10. As illustrated in FIG. 2, the left camera unit 26a and the right camera unit 26b are directed to different directions while an angle of view of the left camera unit 26a (first angle of view) and an angle of view of the right camera unit 26b (second angle of view) are partially overlapped. Therefore, when each of the two the camera units 26 captures movie images, and then images of each frame are stitched, a movie image can be generated with an angle of view greater than the angle of view of one camera unit 26 such as an angle close to two times of the angle of view of one camera unit 26.

When a plurality of frame images is stitched by the image capturing apparatus 10 (FIG. 1, FIG. 1) to generate a plurality of synthesis frames (synthesis images) composing a movie image, an optimum stitching position is required to be detected for each of frames in view of an effect of disparity between the pluralities of the camera units 26 such as two or more camera units 26. Typically, the optimum stitching position can be detected by matching the same object existing in an overlapping portion of two corresponding frames. When the optimum stitching position is detected for the movie image composed of a plurality of synthesis frames, a target object used for detecting the optimum stitching position between the corresponding frames may become different for each of the plurality of synthesis frames.

FIG. 3 illustrates a conventional process of stitching a plurality of frames composing a movie image, which may have some problems. FIG. 3 illustrates an example of a movie image composed of a plurality of frames captured at a plurality of time points. For example, left frames LF1, LF2, and LF3 at a time point such as Time "1", Time "2," and Time "3" are captured by the left camera unit 26a, right frames RF1, RF2, and RF3 at Time "1", Time "2," and Time "3" are captured by the right camera unit 26, and the left frames LF1, LF2, and LF3 and right frames RF1, RF2, and RF3 are stitched to generate synthesis frames SF1, SF2, and SF3," in which time proceeds from Time "1", Time "2," to Time "3." In FIG. 3, an overlapping portion of the left frame LFn and the right frame RFn is indicated by a dotted line area in each of the left frames and the right frames.

FIG. 3 illustrates an example of a scene having a tree at a far side from the camera units 26, and a person is running from left to right (crossing from left to right) at a near side from the camera units 26, which means the person is crossing a space between the left camera unit 26a and the right camera unit 26. Movie image capturing is typically performed by capturing about thirty or more frames per second. Therefore, the person may not move so greatly between the frames captured at different time points. FIG. 3 illustrates a scene emphasizing a movement of the person for the sake of explanation. The scene is captured by the two camera units 26 illustrated in FIG. 2.

As illustrated in FIG. 3, a scene at Time "1" corresponds to a scene before the person crosses from the left to right, and a scene at Time "3" corresponds to a scene after the person crosses from the left to right. At Time "1" and Time "3," the tree at the far side is in an overlapping portion of the left frames (LF1, LF3) and the right frames (RF1, RF3) but the person at the near side is not in the overlapping portion of the left frames (LF1, LF3) and the right frames (RF1, RF3). Therefore, the synthesis frames (SF1, SF3) can be generated by appropriately matching the position of the same tree in the left frames (LF1, LF3) and the right frames (RF1, RF3) as shown in FIG. 3 based on the feature of the tree.

By contrast, a scene at Time "2" corresponds to a scene that the person is crossing the overlapping portion, in which both of the tree at the far side and the person at the near side are in the overlapping portion of the left frame (LF2) and the right frame (RF2). In this case, if it is determined that deviation of the entire image can be set little by overlapping the same person in the left and the right frames (i.e., greater weight is set for the person), the image stitching processing can be performed as illustrated in FIG. 3, in which the tree is not seen as one tree but is seen as two trees, which means the one tree is seen as double image.

When a time series of the synthesis frames SF1, SF2, SF3 (FIG. 3) is viewed as one movie image, a viewer feels that the tree at the far side moves disruptively between the synthesis frames, with which the viewer feels oddness strongly. Further, if it is determined that deviation of the entire image can be set little by overlapping the tree in the left and the right frames (i.e., greater weight is set for the tree), the image stitching processing can be performed similar to the above case setting the greater weight to the person, and the person is not seen as one person but is seen as two persons, which means the one person is seen as double image.

Further, at Time "2," the person is at the right side of the tree in the left frame LF2 while the person is at the left side of the tree in the right frame RF2. This positional difference is caused by disparity of the two camera units 26, which means the positional difference is caused by different capturing locations of the two camera units 26. The above described positional deviation between the near side and the far side occurs when a scene is captured by using a plurality of optical imaging systems at the same time.

Therefore, as to the image capturing apparatus 10, when each one of a plurality of partial images (e.g., one left frame and corresponding one right frame) are synthesized as one synthesis image (synthesis frame), and all of the partial images are synthesized as a plurality of synthesis images to generate one movie image, a stitching position is detected for each of the partial images (e.g., one left frame and corresponding one right frame) to be stitched as one synthesis images, and then the stitching position at each time point is corrected based on a stitching position detected for one synthesis frame and a stitching position detected for one or more adjacent synthesis frames along the time line before performing the image stitching. With this configuration, continuity at the stitching positions between the synthesis frames can be maintained.

Figure 7:
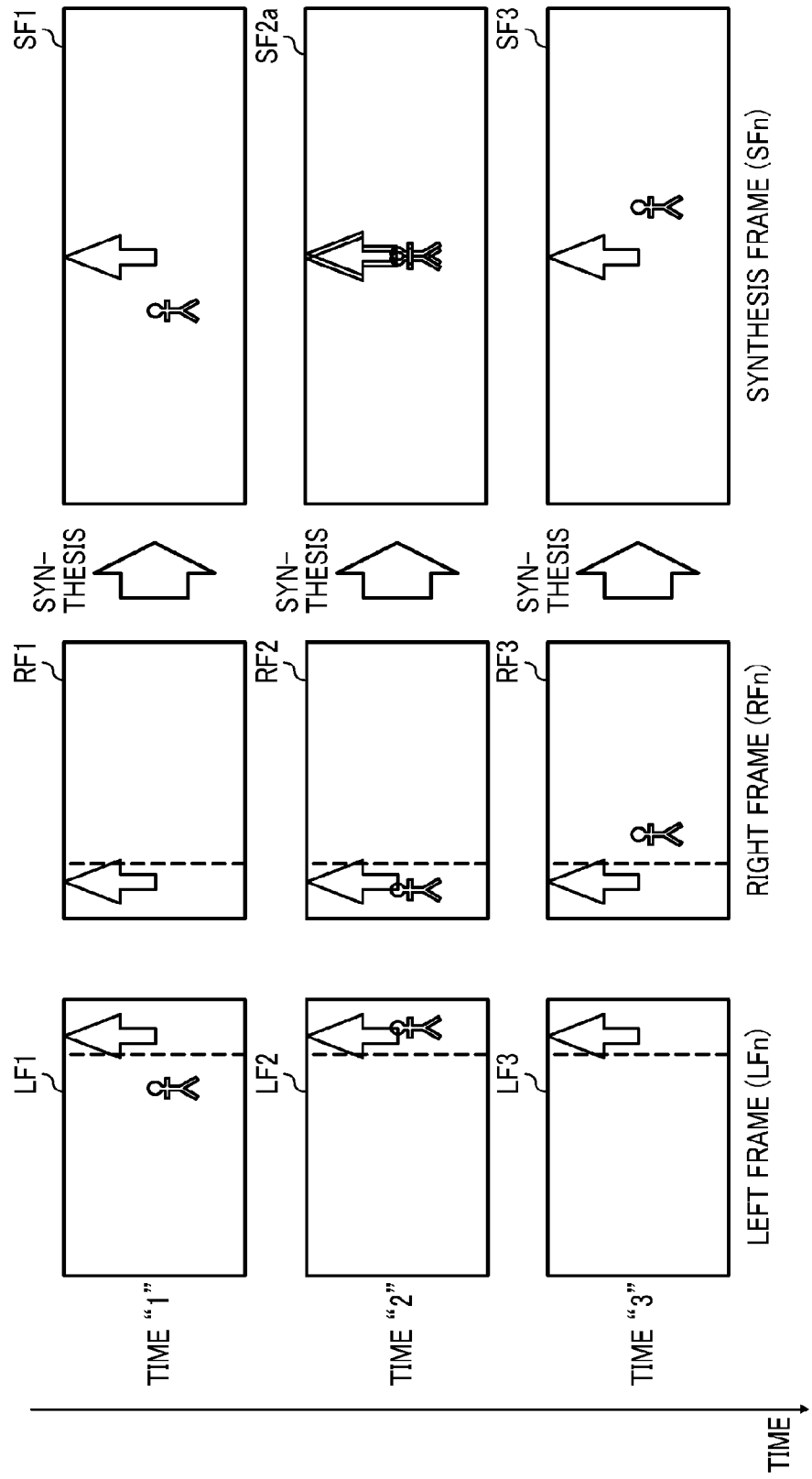
FIG. 7 illustrates a process result of image synthesis processing according to a first example embodiment.

In this description, an image of each of one side frame such as the left frames LFn (n=1, 2, 3 . . . n) may be referred to a first partial image, an image of each of another side frame such as the right frames RFn (n=1, 2, 3 . . . n) may be referred to a second partial image, a time series of the left frames LFn such as LF1, LF2, LF3 may be referred to a first image sequence, and a time series of the right frames RFn such as RF1, RF2, RF3 may be referred to a second image sequence, in which the first image sequence is composed of a plurality of first partial images, and the second image sequence is composed of a plurality of second partial images. Further, each of the synthesis frames SFn (n=1, 2, 3 . . . n) can be generated or synthesized by stitching the left frames LFn (n=1, 2, 3 . . . n) and corresponding right frames RFn (n=1, 2, 3 . . . n) as shown in FIGS. 3 and 7. Therefore, a movie image is composed of a plurality of synthesis frames SFn generated by stitching the left frames and corresponding right frames, which means the movie image is composed of the plurality of synthesis frames (synthesis images) generated from the first image sequence and the second image sequence.

A description is given of a stitching process of a movie image according to the first example embodiment with reference to FIGS. 4 to 7. FIG. 4 illustrates a functional block 100 used for the stitching process of a movie image with data flow. The functional block 100 can be implemented by the image processing unit 20, the CPU 14, a combination of the image processing unit 20 and the CPU 14, or a combination of the image processing unit 20, the CPU 14, the SRAM 16, and the SDRAM 32 shown in FIG. 1, which can be selectively designed as required.

As illustrates in FIG. 4, the functional block 100 can be configured with, for example, a left frame receiver 102, a right frame receiver 104, a left frame memory 110, a right frame memory 120, a stitching position detector 130, a stitching position information memory 140, a stitching position information correction unit 150, an image stitching processing unit 160, and a movie image compression unit 170.

Each of the left frame receiver 102 and the right frame receiver 104 can be used as an image receiver of the first example embodiment. Specifically, the left frame receiver 102 receives frame image data (e.g., left frame image LFn) captured by the left camera unit 26a with a given frame rate, and the right frame receiver 104 receives frame image data (e.g., right frame image RFn) captured by the right camera unit 26b with the same given frame rate. In this description, the frame means each of "discrete frames" composing a movie image. Specifically, one movie image can be composed of a plurality of synthesis image frames, and each of the synthesis image frames is generated by stitching a plurality of partial images. As described in one or more example embodiments, a plurality of partial image frames (first partial image) is captured as a string of images along the time line (first image sequence) and a plurality of corresponding partial images (second partial image) is captured as a string of another images along the time line (second image sequence), and thereby one movie image can be generated from the first image sequence and the second image sequence by synthesizing a plurality of first partial images and a plurality of the second partial images.

The left frame memory 110 reads frame image data received by the left frame receiver 102, and stores the read frame image data, and the right frame memory 120 reads frame image data received by the right frame receiver 104, and stores the read frame image data. The left frame memory 110 temporary stores at least image data of one frame, and the right frame memory 120 temporary stores at least image data of one frame.

For example, the left frame memory 110 has storage areas for a plurality of frames and retains the frame image data by applying first-in-first-out (FIFO), and the right frame memory 120 has storage areas for a plurality of frames and retains the frame image data by applying first-in-first-out (FIFO). Therefore, when a new frame image data is to be stored while all of the storage areas are already filled, the oldest frame image data is pushed out and deleted. FIG. 5A illustrates a detail of each of the left frame memory 110 and he right frame memory 120. As illustrated in FIG. 5A, each of the left frame memory 110 and the right frame memory 120 has, for example, storage areas for two frames.

The stitching position detector 130 detects an optimum stitching position when stitching a plurality of frame image data captured at the substantially same point in time, and stored in the left frame memory 110 and the right frame memory 120. The stitching position can be detected by applying the template matching, but not limited hereto. The stitching position detector 130 can be used as a detection unit that detects the stitching position of the first example embodiment.

The stitching position information memory 140 temporary stores the stitching position information at a plurality of time points detected by the stitching position detector 130. The stitching position information memory 140 can be used as a stitching position information storage unit of the first example embodiment.

In the first example embodiment, the stitching position information memory 140 has storage areas for a plurality of frames, and retains the stitching position information by applying first-in-first-out (FIFO). Therefore, when new stitching position information is to be stored while all of the storage areas are already filled, the oldest stitching position information is pushed out and deleted. FIG. 5A illustrates a detail of the stitching position information memory 140. As illustrated in FIG. 5A, the stitching position information memory 140 has, for example, storage areas for three frames.

The stitching position information correction unit 150 corrects the stitching position information detected at a plurality of time points and stored in the stitching position information memory 140. For example, the stitching position information correction unit 150 corrects the stitching position information by perfuming averaging process along the time line, which is known as smoothing. The averaging process can be performed by a weight-applied averaging process, a low-pass filter, a median filter, but not limited thereto. In one or more example embodiments of the present invention, the stitching position information detected at each time point can be corrected by using the stitching position information detected at a plurality of time points. The stitching position information correction unit 150 can be used as a correction unit of the first example embodiment.

The image stitching processing unit 160 reads out image data of frames captured at the substantially same point in time from the left frame memory 110 and the right frame memory 120, and synthesizes the image data of frames captured at the same time point by using the stitching position information corrected by the stitching position information correction unit 150 (hereinafter, corrected stitching position information). The image stitching processing unit 160 can be used as an image synthesis processing unit of the first example embodiment.

In an example case of FIG. 5A, image data for two frames are stored in each of the left frame memory 110 and the right frame memory 120, and stitching position information for three frames is stored in the stitching position information memory 140. The stitching position information of a plurality of frames detected at a plurality of time points, including the stitching position information of the latest frame, is corrected as the corrected stitching position information. The image stitching processing unit 160 reads out image data of one frame (frame "N-1") prior to the latest frame (frame "N") from each of the left frame memory 110 and the right frame memory 120, and stitches the read image data to generate a synthesis frame image based on the corrected stitching position information at the plurality of time points. With this configuration, a memory capacity of the image capturing apparatus 10 can be reduced.

The movie image compression unit 170 includes, for example, a codec block that performs movie compression and de-compression such as H.264, and MPEG 4. The movie image compression unit 170 receives a plurality of synthesis frames generated as a movie image. The movie image compression unit 170 performs movie compression to the synthesis frames to generate a movie data, in which each of the synthesis frames composing the movie data can be referred to a "discrete frame." The movie image compression unit 170 can be used as a movie image generator of the first example embodiment. As above described, the movie image compression unit 170 generates the movie data composed of the plurality of the synthesis frames, wherein the plurality of synthesis image frames SFn can be generated by stitching the left frame images LFn (first image sequence) and corresponding right frame images (second image sequence) as above described.

Figure 6:
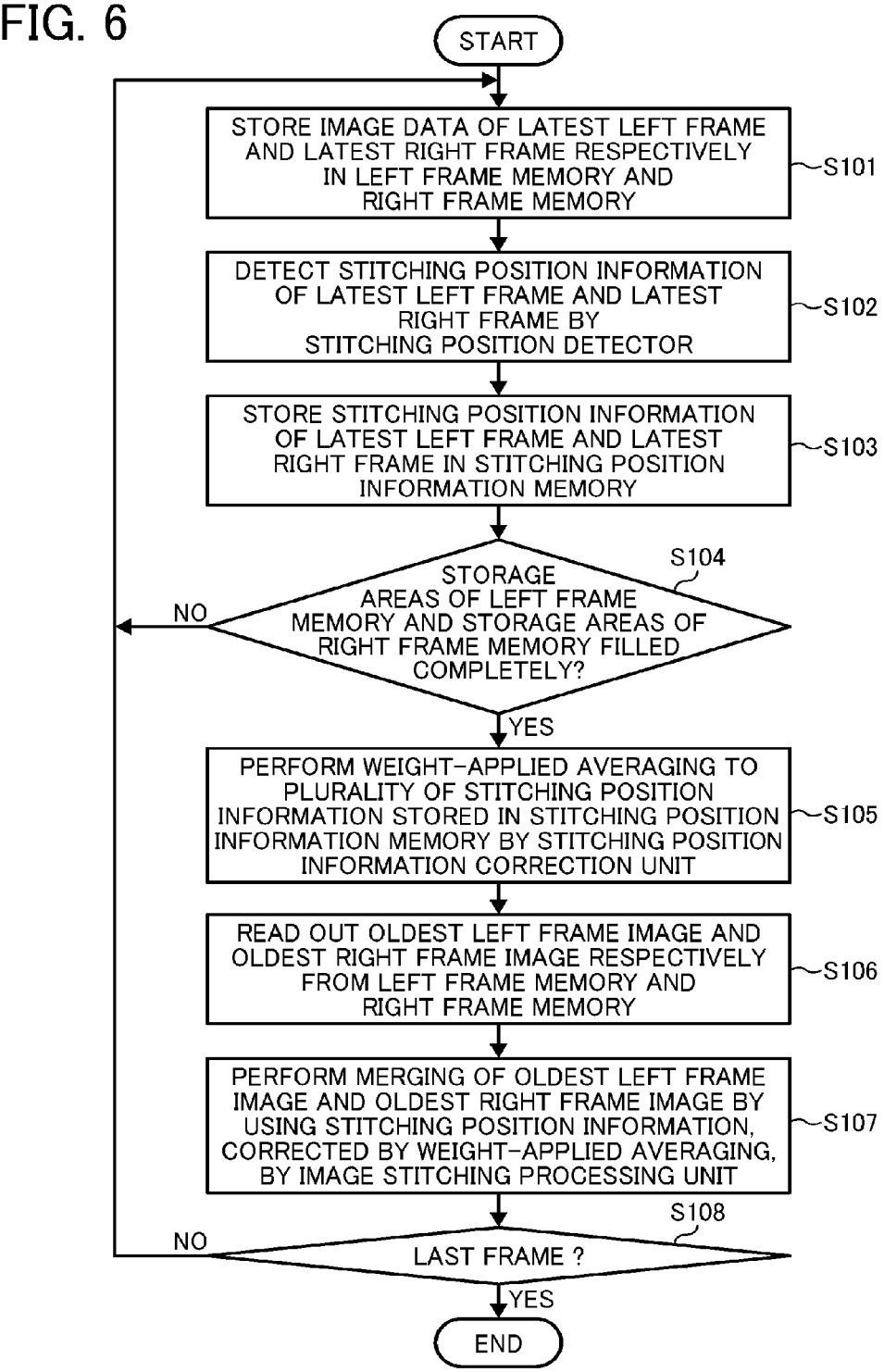
FIG. 6 is a flowchart showing the steps of process of synthesizing images for generating a movie image composed of a plurality of synthesis images performable by the image capturing apparatus of the first example embodiment.

A description is given of the image synthesis processing for generating synthesized movie images with reference to FIG. 6. FIG. 6 is a flowchart showing the steps of process of synthesizing images for generating a movie image composed of a plurality of synthesis images performable by the image capturing apparatus 10 of the first example embodiment.

The processing of FIG. 6 can be started when image data is input to the left frame receiver 102 and the right frame receiver 104 of the image processing unit 20 from the solid state image sensors 28a and 28b respectively. At step S101, the image capturing apparatus 10 stores image data of the latest left frame in the left frame memory 110, and image data of the latest right frame in the right frame memory 120. If the storage areas for two frames are already filled, the oldest frame is deleted.

At step S102, the stitching position detector 130 of the image capturing apparatus 10 detects a stitching position of the latest left frame and the latest right frame, and generates stitching position information. The stitching position information can be computed as a deviation amount from a given reference position set in advance. Specifically, when one frame (e.g., left frame) is stitched with a counterpart frame (e.g., right frame), a position of the one frame is compared with the given reference position, and a positional difference of the one frame with respect to the given reference position is set as the deviation amount. The stitching position information is typically defined as the deviation amount counted by the number of pixels in the vertical direction and the horizontal direction. In this description, the stitching position information is obtained as the deviation amount from the one given reference position set for the frames but not limited hereto. For example, in other configuration, the overlapping portion is divided into a plurality of sub-portions, and a given reference position is set for each of the sub-portions, with which a plurality of given reference positions is set for the overlapping portion. In this configuration, a deviation amount of the frames is obtained for each of the sub-portions. After the deviation amount is obtained for each of the sub-portions, an interpolation of the deviation amount is performed to each of pixels existing in the overlapping portion as required.

At step S103, the image capturing apparatus 10 stores the stitching position information detected for the latest frame in the stitching position information memory 140. If the storage areas for three frames are already filled, the oldest stitching position information is deleted.

At step S104, the image capturing apparatus 10 determines whether all of the storage areas of the left frame memory 110 and all of the storage areas of the right frame memory 120 are already filled. If it is determined that all of the storage areas are not filled (S104: NO), the sequence loops to S101, and waits an input of image data of a frame. By contrast, if it is determined that all of the storage areas are already filled (S104: YES), the sequence proceeds to step S105. In an example case of FIG. 5A, it is determined that the storage areas are not filled yet when the first frame (beginning frame) is processed, and it is determined that all of the storage areas are already filled when the second and subsequent frames are processed.

At step S105, a plurality of stitching position information stored in the stitching position information memory 140 is read out, and the stitching position information correction unit 150 performs the weight-applied averaging to the plurality of stitching position information. When information of three stitching positions stored in the stitching position information memory 140 are defined as $(\Delta X_{-1}, \Delta Y_{-1})$, $(\Delta X_0, \Delta Y_0)$, and $(\Delta X_{+1}, \Delta Y_{+1})$, the corrected stitching position information ($\Delta Xave$, $\Delta Yave$) can be calculated by using the below formulas (1A) and (1B), in which each of $\Delta X_{-1}$, $\Delta X_0$, $\Delta X_{+1}$ respectively represents the stitching position in the horizontal direction of an image for a previous frame at a time point that is two points before the latest time point, a previous frame at a time point that is one point before the latest time point, and a latest frame at the latest time point. Each of $\Delta Y_{-1}$, $\Delta Y_0$, $Y_{+1}$ respectively represents the stitching position in the vertical direction of an image for a previous frame at a time point that is two points before the latest time point, a previous frame at a time point that is one point before the latest time point, and a latest frame at the latest time point. Each of $C_{-1}$, $C_0$, $C_{+1}$ respectively represents a weight set for a previous frame at a time point that is two points before the latest time point, a previous frame at a time point that is one point before the latest time point, and a latest frame at the latest time point. For example, $C_{-1}$ and $C_{+1}$ are set 0.2, and $C_0$ is set 0.6. The weight (i.e., coefficient $C_0$) for the stitching position information ($\Delta X_0$, $\Delta Y_0$) corresponding to a target time point of image synthesis processing can be set to a greater value.

$$\Delta Xave = C_{-1} \times \Delta X_{-1} + C_0 \times \Delta X_0 + C_{+1} \times \Delta X_{+1} \quad (1A)$$

$$\Delta Yave = C_{-1} \times \Delta Y_{-1} + C_0 \times \Delta Y_0 + C_{+1} \Delta Y_{+1} \quad (1B)$$

As indicated by the formula (1), the stitching position information can be corrected by setting a greatest weight to the stitching position information ($\Delta X_0$, $\Delta Y_0$) detected for a target frame to be processed for image synthesis while adding the effect of the stitching position information ($\Delta X_{-1}$, $\Delta Y_{-1}$) and ($\Delta X_{+1}$, $\Delta Y_{+1}$) detected from one or more frames before the target frame, and one or more frames after the target frame. With this configuration, continuity of images between the synthesis frames can be enhanced.

At step S106, the image capturing apparatus 10 reads out the oldest frame stored in the left frame memory 110 and the right frame memory 120. Since the left frame memory 110 and the right frame memory 120 store image data by applying "FIFO," when image data of one frame is read out, the oldest frame is automatically read out. In the first example embodiment, the stitching position information of the oldest frame may correspond to ($\Delta X_0$, $\Delta Y_0$).

At step S107, the image stitching processing unit 160 performs the image stitching processing (image synthesis processing) to the oldest left frame and the oldest right frame, read out at step S106, by using the corrected stitching position information ($\Delta Xave$, $\Delta Yave$), generated by performing the weight-applied averaging.

At step S108, the image capturing apparatus 10 determines whether the input frame is the last frame. If it is determined that the input frame is not the last frame (S108: NO), the sequence loops to step S101, and continues the image synthesis processing. By contrast, if no further frames is input, and it is determined that the input frame is the last frame (S108: YES), the image synthesis processing ends.

A time series of synthesis images composed of the synthesis frames generated by the processing of FIG. 6 are sequentially output to the movie image compression unit 170, and then the movie image compression unit 170 performs the movie compression to the time series of synthesis images, and outputs the time series of synthesis images as movie data.

A description is given of the image synthesis processing of the first example embodiment with reference to FIG. 7. FIG. 7 illustrates a process result of the image synthesis processing of the first example embodiment. FIG. 7 illustrates an example of the image synthesis processing performed to the same image sequences described in FIG. 3.

Similar to FIG. 3, an overlapping position of the tree at the far side between the frames (LF1 and RF1, LF3 and RF3) is detected as the stitching position at Time "1" and Time "3," and a position where the person matches exactly between the frames LF2 and RF2 is detected as the stitching position at Time "2," in which the tree at the far side is not matched in the synthesis image SF2 (FIG. 3), which means the tree is seen at two positions deviating greatly in the synthesis image SF2 (FIG. 3).

By contrast, as to the image synthesis processing of the first example embodiment, after detecting the stitching position information for each of the frames, the stitching position information is corrected by performing the weight-applied averaging to the stitching position information detected for a target frame and one or more frames before and after the target frame, which exist near the target frame along the time line, and then the stitching of the target frame is performed using the corrected stitching position information.

When the left frame LF2 and the right frame RF2 at Time "2" are stitched into the synthesis frame SF2a as shown in FIG. 7, the weight-applied averaging is performed to the stitching position information set to the frames of Time "1", Time "2" and Time "3." When the weight-applied averaging is not performed, the stitching position is set as a position where the person matches or overlaps exactly between the left and right frame while the tree at the far side deviates greatly between the left and right frames.

By contrast, when the weight-applied averaging is performed, the stitching position becomes a position where the person overlaps without exact matching between the left and right frames, and the tree at the far side also overlaps without exact matching between the left and right frames as illustrated as the synthesis frame SF2a in FIG. 7. As to the synthesis frame SF2a, the person overlaps without exact matching, and the tree also overlaps without exact matching but the deviation of the person and the tree may not cause strong oddness. Specifically, if the synthesis frame SF2a at Time "2" is viewed alone, the target image (e.g., person)

does not overlap exactly in the synthesis frame SF2a. However, if the synthesis frame SF2a at Time "2" is viewed as one frame of a plurality of synthesis frames composing one movie image, a disruptive movement of the tree at the far side can be suppressed, and thereby a viewer does not feel oddness in the movie image compared to conventional system that the disruptive movement of the tree becomes prominent (see SF2 in FIG. 3) that a viewer feels oddness strongly in the movie image.

In the above described first example embodiment, each of the left frame memory 110 and the right frame memory 120 has the storage areas for two frames, and the stitching position information memory 140 has the storage areas for three frames but not limited thereto. For example, in one variant configuration, the storage area of the left frame memory 110 and the storage area of the right frame memory 120 can be reduced by reducing the number of frames store-able in the left frame memory 110 and the right frame memory 120. In the above described configurations, the storage area of the stitching position information memory 140 is set greater than the storage area of the left frame memory 110 and the right frame memory 120 so that the correction of the stitching position can be performed.

FIG. 5B illustrates a detail of a left frame memory 210, a right frame memory 220, and a stitching position information memory 240 used for the variant configuration. In the variant configuration of FIG. 5B, the storage area of the left frame memory 210 has the storage area one frame, The storage area of the right frame memory 220 has the storage area one frame, and the stitching position information memory 240 has the storage area for two frames.

In the variant configuration of FIG. 5B, the stitching position information memory 240 stores the stitching position information of one frame prior to the latest frame, and the stitching position information of the latest frame. Therefore, different from the stitching position information memory 140 (FIG. 5A), the stitching position information memory 240 does not store the stitching position information of one frame after the latest frame. With this configuration, continuity between the frames can be maintained while reducing storage capacities of the memories.

In the configuration of FIG. 5A, the stitching position is corrected based on the stitching position information of three frames such as a target frame for synthesis, one frame before the target frame, and one frame after the target frame. In the variant configuration of FIG. 5B, the stitching position is corrected based on the stitching position information of two frames such as a target frame for synthesis, and one frame after the target frame. However, the stitching position can be corrected further differently.

For example, in one variant configuration, the stitching position can be corrected based on the stitching position information of seven frames such as a target frame, three frames before the target frame, and three frames after the target frame, with which, continuity between the frames can be maintained in a broader range. Further, in another variant configuration, the stitching position can be corrected based on the stitching position information of eight frames such as a target frame for synthesis, two frames before the target frame, and five frames after the target frame, in which the number of frames before the target frame and the number of frames after the target frame are set differently. In these variant configurations, storage capacities of the frame memories and the stitching position information memory can be adjusted in line with the correction processing of the stitching position.

As to the first example embodiment, the two camera units 26 having different shooting directions are used to capture two movie images, and by stitching the two images, a movie image can be generated with an angle of view greater than the angle of view of one camera unit such as an angle close to two times of the angle of view of one camera unit. However, the number of the camera units is not limited two, but three of more camera units can be employed.

Further, by shifting the position of one camera unit in the horizontal direction or the vertical direction, a movie image can be generated with an angle of view greater than the angle of view of one camera unit in the one direction, or by shifting the position of one camera unit in the horizontal direction and the vertical direction, a movie image can be generated with an angle of view greater than the angle of view of one camera unit in the e horizontal direction and the vertical direction.

Further, in other configuration, a movie image can be generated by moving one camera unit along the horizontal direction or the vertical direction for one round to synthesize a panorama image, or a movie image can be generated by moving one camera unit along the horizontal direction and the vertical direction for one round to synthesize a hemispherical photographed image.

(Second Example Embodiment)

A description is given of a hemispherical image capturing device 300 that can capture all directions from an image-capturing location as a second example embodiment.

Figure 8:
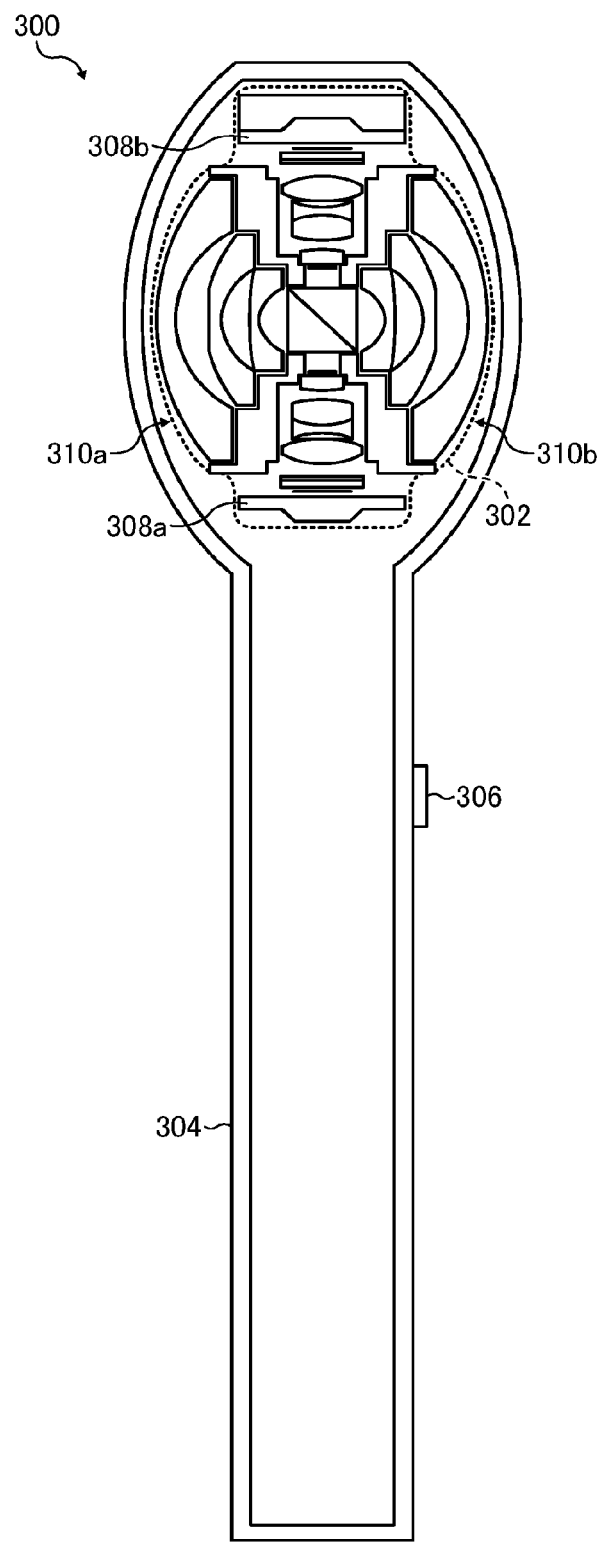
FIG. 8 is a schematic cross-sectional view of a hemispherical image capturing device according to a second example embodiment.

FIG. 8 is a schematic cross-sectional view of a hemispherical image capturing device 300 of the second example embodiment. The hemispherical image capturing device 300 includes, for example, an image capturing unit 302, a casing 304, and a shutter button 306. The casing 304 can hold the image capturing unit 302, and parts such as a controller and a battery, and the shutter button 306 is disposed on the casing 304. The image capturing unit 302 includes, for example, two solid state image sensors 308a and 308b, and two lens optical units 310a and 310b. Each of the lens optical units 310a and 310b employs, for example, a fisheye lens composed of seven lens elements of six groups.

In a configuration of FIG. 8, the fisheye lens has an angle of view greater than 180 degrees (=360 degrees/n; n=2). Preferably, the angle of view is 185 degrees or more, and more preferably, the angle of view is 190 degrees or more. Although the solid state image sensors 308 are disposed at the upper and lower positions, the solid state image sensors 308a and 308b can be disposed at other positions by adjusting the lens optical units 310a and 310b.

The optical elements (lens, prism, filter, and aperture stop) in the lens optical units 310a and 310b are set at given positions with respect to the solid state image sensors 308a and 308b. In a configuration of FIG. 8, the lens optical units 310a and 310b have the same configuration, and the lens optical units 310a and 310b are arranged at the opposite sides by matching the optical axis of the lens optical unit 310a and the optical axis of the lens optical unit 310b. Each of the solid state image sensors 308a and 308b receive light and converts the received light to image signals, and outputs the image signals to the image processing block of the controller.

When the solid state image sensor 308a inputs one image sequence (first image sequence) composed of a plurality of fish-eye images, and the solid state image sensor 308b inputs another image sequence (second image sequence) composed of a plurality of fish-eye images to the image processing block, the image processing block stitches the plurality of image sequences (first image sequence and second image sequence) composed of the plurality of fish-eye images to generate a movie image having a solid angle of 4π steradian (hereinafter, full hemispherical movie image). The full hemispherical movie image is a movie image capturing all directions viewable from an image-capturing location.

Since each of a plurality of optical imaging systems has a given angle of view, by combining the angle of view of the plurality of optical imaging systems, a solid angle of 4π steradian can be covered, and the synthesis images composing the hemispherical photographed image can be generated from the first image sequence and second image sequence. In a configuration of FIG. 8, a hemispherical photographed image is generated, but other image such as an image capturing 360 degrees for only the horizontal direction (i.e., panorama image) can be generated.

As above described, the fisheye lens has the angle of view greater than 180 degrees. Therefore, when the hemispherical photographed image is generated, frame images captured by each of the optical imaging systems have an overlapping portion. The overlapping portion of the frames can be used to detect a stitching position of an image of the same object existing in the corresponding frames. The generated hemispherical photographed movie image can be output to an external storage medium such as a secure digital (SD: registered trademark) card and compact flash (registered trademark). The hardware configuration of the first example embodiment shown in FIG. 1 can be also employed for the hemispherical image capturing device 300, and thereby the explanation of the same hardware configuration is omitted for the following description.

As to the hemispherical image capturing device 300 of FIG. 8, as a preliminary process, two fish-eye images are converted to image data having hemispherical image format, with which the image stitching processing described for the first example embodiment can be applied.

A description is given of the hemispherical image capturing device 300 having synthesis capability of a full hemispherical movie image with reference to FIGS. 9 to 18. FIG. 9 illustrates an image processing unit 400 of the hemispherical image capturing device 300 used for synthesizing a hemispherical movie image.

As illustrated in FIG. 9, then image processing unit 400 includes, for example, a frame memory 402a for storing a partial image "0," a frame memory 402b for storing a partial image "1," a position-detection distortion correction unit 404, a stitching position detector 406, a stitching position information memory 408, a stitching position information correction unit 410, a table modification unit 412, a table generation unit 414, an image-synthesis distortion correction unit 416, and an image synthesis unit 418. The image processing unit 400 can be implemented by one or more processing circuits or circuitry.

The image processing unit 400 receives two partial images for each of frames from the two solid state image sensors 308a and 308b after performing various processing to image signals. In this configuration, a frame image input from the solid state image sensor 308a is referred as a partial image "0" (first partial image) and a frame image input from the solid state image sensor 308b is referred as a partial image "1" (second partial image).

Further, the image processing unit 400 is provided with a position-detection conversion table 430, which can be generated at manufactures or the like in advance based on design data of the lens optical unit and a given projection model. Since the position-detection conversion table 430 can be used to correct distortion of images captured by the fisheye lens, the position-detection conversion table 430 can be referred to as a distortion correction table (first conversion table).

As a process before performing the detection process of the stitching position, the position-detection distortion correction unit 404 performs the distortion correction to the input partial image "0" and the partial image "1" by using the position-detection conversion table 430 to generate a corrected partial image "0" used for position detection and corrected partial image "1" used for position detection.

The input partial image "0" and the partial image "1" are image data expressed by the planar coordinate system (x, y) while the distortion corrected partial images corrected by using the position-detection conversion table 430 are image data of hemispherical image format expressed by the spherical coordinate system (polar coordinates system having a moving radius of 1, and two amplitudes of θ, φ). The position-detection distortion correction unit 404 can be used as a position-matching conversion unit of the second example embodiment.

Figure 11A:
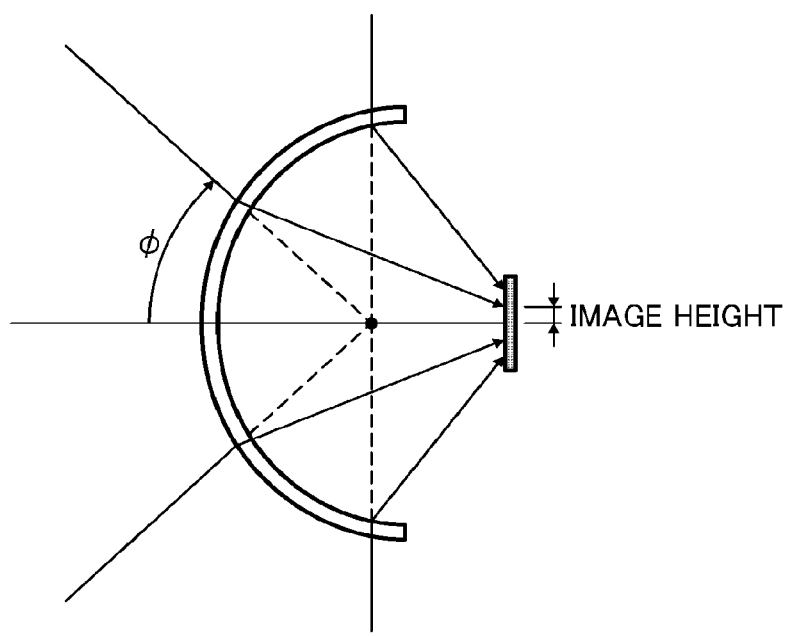
FIG. 11A and 11B illustrate an example of a projective relationship of the hemispherical image capturing device according to a second example embodiment.
Figure 11B:
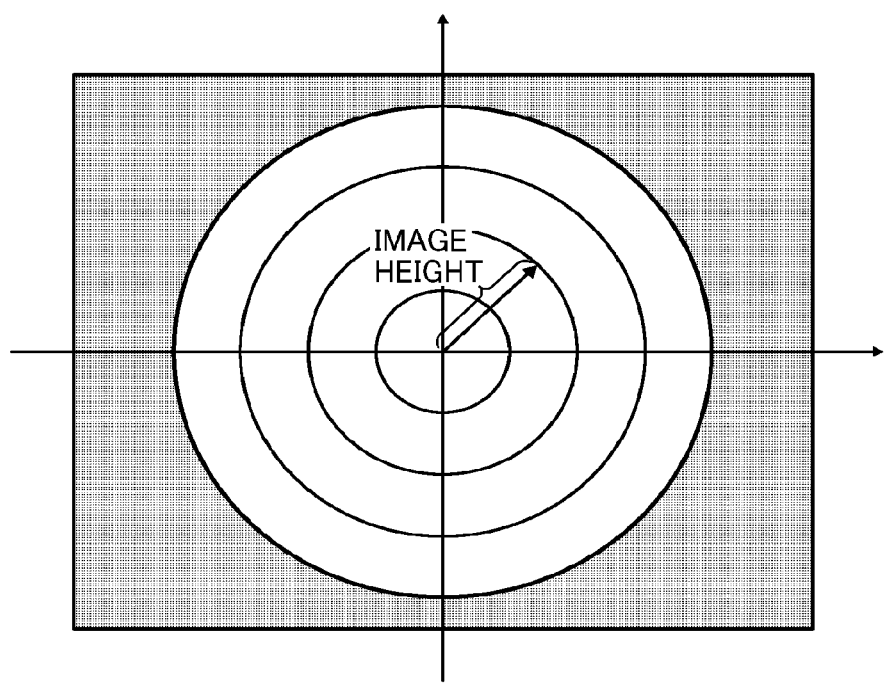

FIG. 11 illustrates an example of a projective relationship of the hemispherical image capturing device 300 of the second example embodiment. One image captured by one fisheye lens becomes an image that captures almost one-hemisphere direction from an image-capturing location. Further, as illustrated in FIG. 11A, the fisheye lens forms an image having the image height "h" corresponding to the incidence angle "φ" defined with respect to the optical axis. The relationship of the image height "h" and the incidence angle "φ" can be determined by a projective transformation function corresponding to a given projection model. The projective transformation function may vary depending on properties of the fisheye lens. The projection model is, for example, equidistant projection (h=f×φ), central projection (h=f·tanφ), stereographic projection (h=2f·tan(φ/2)), equi-solid angle projection (h=2f·sin(φ/2)), and orthographic projection (h=f·sinφ), in which the image height "h" of the focused image can be determined based on the incidence angle "φ" with respect to the optical axis, and the focal distance "f". Further, in the second example embodiment, a circumferential fisheye lens having an image circle diameter smaller than the image diagonal line can be employed. When the circumferential fisheye lens is used, a partial image becomes a planar image including an entire image circle projecting almost one-hemisphere direction of an image capturing area as illustrated in FIG. 11B.

Figure 12A:
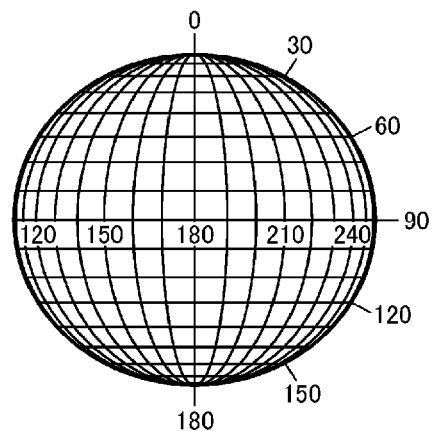
FIG. 12A and 12B illustrate a data structure of image data of hemispherical image format used for the second example embodiment.
Figure 12B:
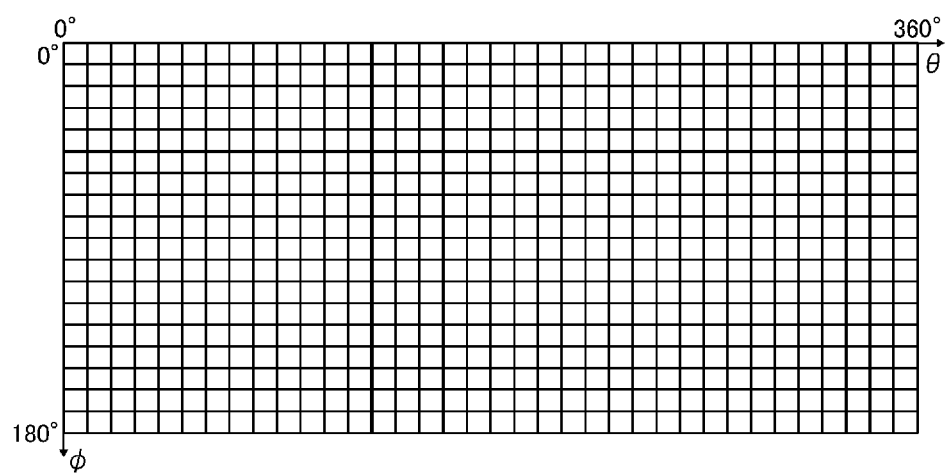

FIG. 12 (12A/12B) illustrates a data structure of image data of hemispherical image format used for the second example embodiment. As illustrated in FIGS. 12A and 12B, image data of hemispherical image format can be expressed with a matrix of pixels having coordinates defined by the vertical angle "φ" corresponding to an angle with respect to a given axis, and the horizontal angle "θ" corresponding to a rotation angle about the given axis. The horizontal angle "θ" has a range of 0 to 360 degrees (or −180 degrees to +180 degrees), and the vertical angle "φ" has a range of 0 to 180 degrees (or −90 degrees to +90 degrees). Each of the coordinates (θ, φ) corresponds to each of points on a sphere expressing all directions by setting the image-capturing location as the center point, and all directions are mapped on the hemispherical photographed image. The relationship of the planar coordinates of an image captured by the fisheye lens, and spherical coordinates of an image having the hemispherical image format can be corresponded by using the projective transformation function described with reference to FIG. 11.

Figures 13A, 13B:
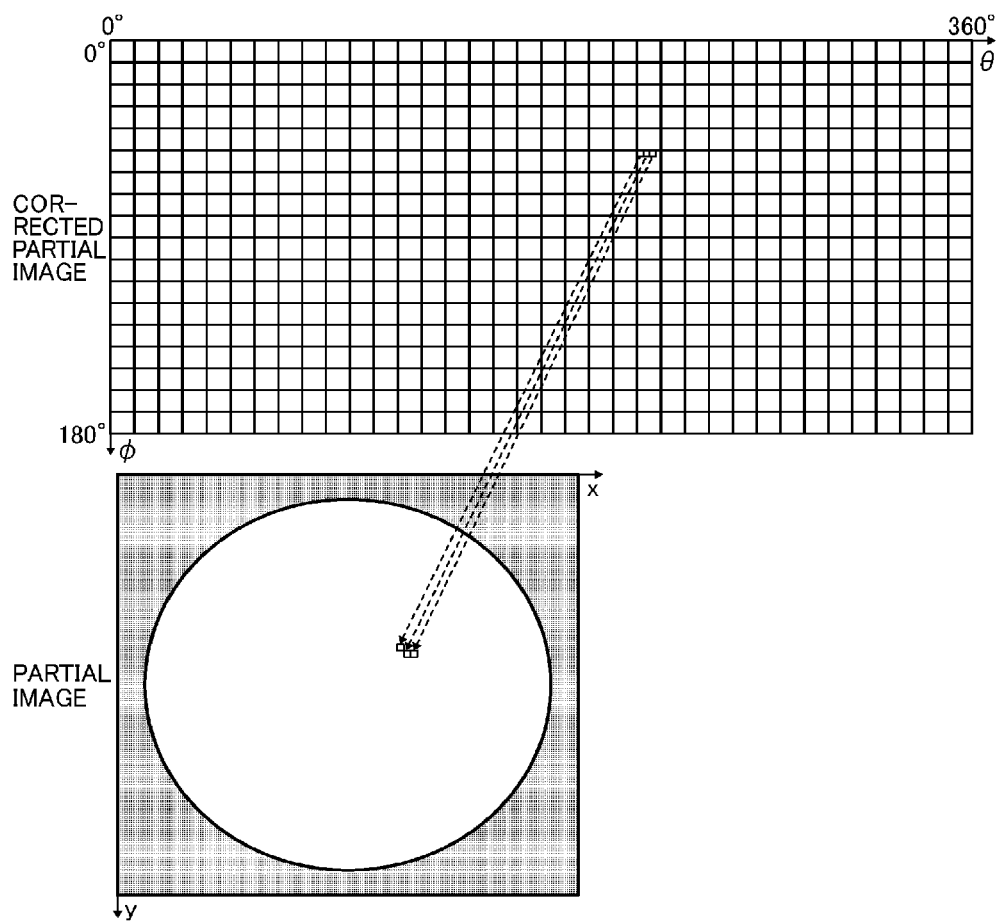
FIG. 13A and 13B illustrate an example of conversion data to be referred by a position-detection distortion correction unit and an image-synthesis distortion correction unit of the second example embodiment.

FIG. 13 is an example of a conversion data to be referred by the position-detection distortion correction unit 404 and the image-synthesis distortion correction unit 416 of the second example embodiment. The position-detection conversion table 430 and the image-synthesis conversion table 432 defines a projective transformation function for transforming a partial image expressed by the planar coordinate system to an image expressed by the spherical coordinate system. As illustrated in FIG. 13A and 13B, the position-detection conversion table 430 and the image-synthesis conversion table 432 retain information of all coordinates (θ, φ) (θ=0 to 360 degrees, φ=0 to 180 degrees) for each of the fisheye lenses, in which coordinates (θ, φ) of partial images after performing the correction are correlated to coordinates (x, y) of partial images before performing the correction. In FIG. 13A and 13B, an angle set for one pixel is 1/10 degrees for both of the "φ" direction and "θ" direction, and the position-detection conversion table 430 and the image-synthesis conversion table 432 retain information indicating a corresponding relationship for 3600×1800 pixels for each of the fish eye lenses.

The position-detection conversion table 430 used for detecting the stitching position can be generated at the manufactures in advance by correcting the distortion based on an ideal lens model. By contrast, the image-synthesis conversion table 432 can be generated by performing a given conversion processing to the position-detection conversion table 430 to be described later.

Figure 14:
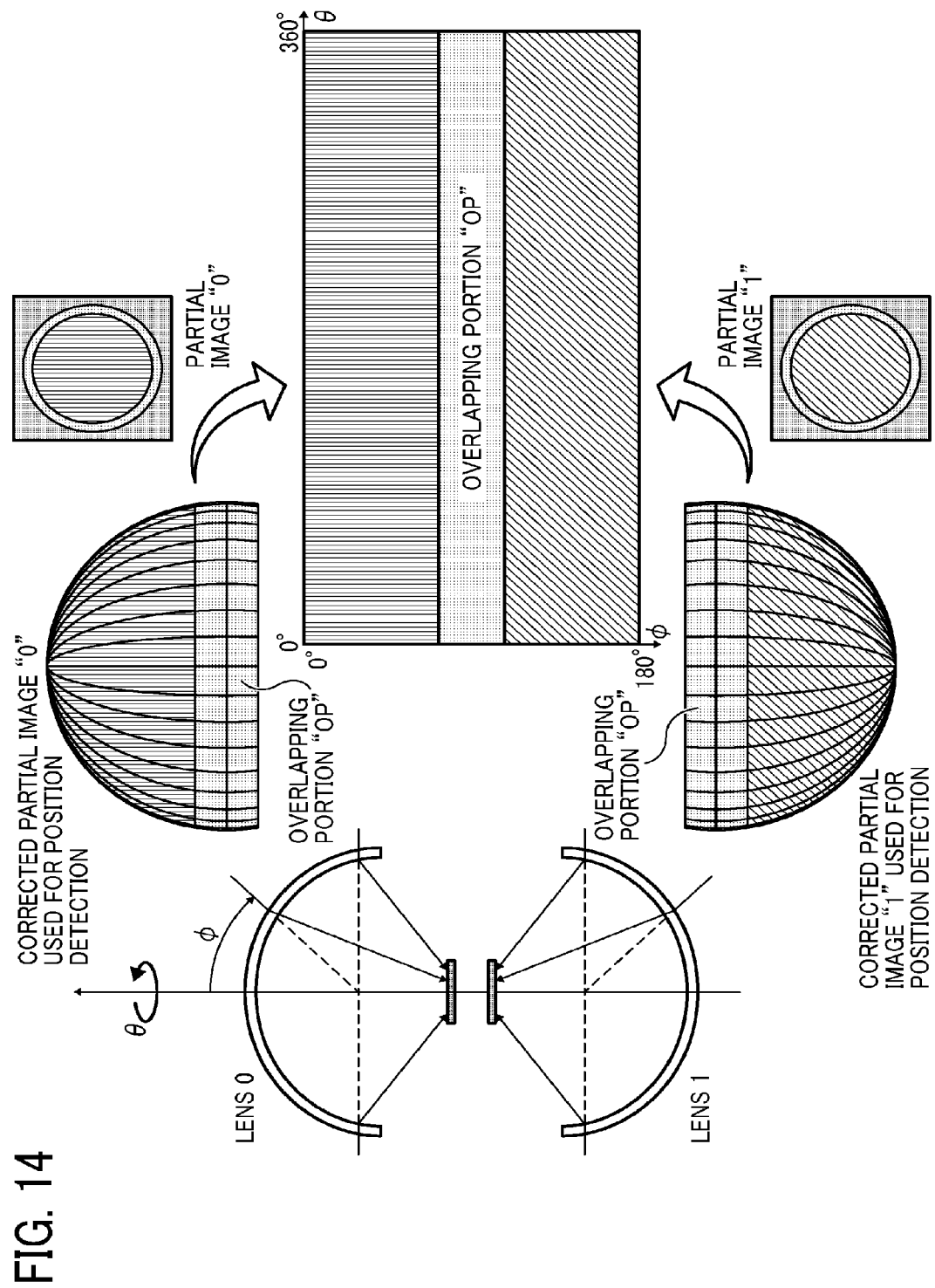
FIG. 14 is an example of mapping two partial images captured by two fisheye lenses to a spherical coordinate system when performing a position detection for the second example embodiment.

FIG. 14 is an example of mapping two partial images captured by two fisheye lenses to the spherical coordinate system when performing the position detection for the second example embodiment. Based on a process result by the position-detection distortion correction unit 404, the two partial images "0" and "1" captured by the fisheye lenses can be loaded with a hemispherical image format as illustrated in FIG. 14. Typically, the partial image "0" captured by the fisheye lens 0 is mapped to the upper-half hemisphere of the full hemisphere, and the partial image "1"captured by the fisheye lens 1 is mapped to the lower-half hemisphere of the full hemisphere. Since the corrected partial image "0" and the corrected partial image "1" expressed by the hemispherical image format are captured using the fisheye lens having the entire angle of view exceeding 180 degrees, each of the corrected partial image "0" and the corrected partial image "1" exceeds outside the half hemisphere. Therefore, when the corrected partial image "0" and the corrected partial image "1" are stitched, an overlapping portion "OP" occurs between the corrected partial image "0" and the corrected partial image "1," wherein the image capturing area of the partial image "0" and the image capturing area of the partial image "1" overlap at the overlapping portion "OP."

By performing the conversation to the hemispherical image format as a pre-process, the stitching position can be detected at the overlapping portion "OP" shown in FIG. 14, and then the correction process of the stitching position described for the first example embodiment can be applied to perform the image stitching, and the full hemispherical movie image composed of a plurality of the synthesis frames can be generated based on the images already converted to the hemispherical image format. Further, the configuration of FIG. 9 employs a method that generates spherical images for position matching and spherical images for image synthesis separately. A description is given of the method with reference to FIG. 9.

After perfuming the correction process by using the position-detection distortion correction unit 404, the stitching position detector 406 detects a stitching position of the corrected partial image in the overlapping portion "OP." The stitching position detector 406 can be used as a detection unit of the second example embodiment.

As illustrated in FIG. 14, the position-detection conversion table 430 can be generated to project the optical axis of each of the two lens optical units to two poles (φ=0, 180 degrees) of the sphere, and to project the overlapping portion "OP" between the corrected partial images to the equator and near the equator (φ=90 degrees±((entire angle of view− 180 degrees)/2)) of the sphere.

As to the spherical coordinate system, as the vertical angle φ becomes closer to the poles (i.e., 0 or 180 degrees), the distortion of image becomes greater, and thereby the detection precision of the stitching position deteriorates. By performing the above described projection, the overlapping portion "OP" can be positioned near the vertical angle of 90 degrees where the image distortion becomes smaller when the image shifts its position to θ direction, and then the stitching position detection is performed. Therefore, the detection precision of the stitching position can be enhanced. Further, even if images are captured by a lens optical unit that causes a greater distortion in captured images, the stitching position can be detected with high precision.

Upon receiving the corrected partial image "0" and the corrected partial image "1" converted by the position-detection distortion correction unit 404, the stitching position detector 406 performs the pattern matching to detect a stitching position of the corrected partial image "0" and the corrected partial image "1" to generate the stitching position information. Similar to the first example embodiment, the stitching position information memory 408 temporary stores the stitching position information detected at a plurality of time points by using the stitching position detector 406. The stitching position information correction unit 410 corrects the stitching position information detected at the plurality of time points and stored in the stitching position information memory 408. For example, the stitching position information correction unit 410 corrects the stitching position information by performing the averaging process along the time line. The stitching position information corrected by the above processing is referred to as the corrected stitching position information.

The table modification unit 412 modifies the position-detection conversion table 430, prepared in advance, based on the corrected stitching position information, and transfers the modified position-detection conversion table 430 to the table generation unit 414. The table generation unit 414 generates an image-synthesis conversion table 432 by performing a rotational coordinate conversion to the modified position-detection conversion table 430, modified by the table modification unit 412. The table modification unit 412 can be used as a table modification unit of the second example embodiment, and the table generation unit 414 can be used as a table generator of the second example embodiment.

As a process before performing the image synthesis processing, the image-synthesis distortion correction unit 416 performs the distortion correction to the original partial image "0" and the original partial image "1" by using the image-synthesis conversion table 432 to generate the corrected partial image "0" used for synthesis and the corrected partial image "1" used for synthesis, in which the partial image "0" and the partial image "1" correspond to the oldest frame stored in the frame memory 402. The image-synthesis distortion correction unit 416 can be used as an image-synthesis conversion unit of the second example embodiment.

Similar to the corrected partial image used for position detection, the corrected partial image "0" used for synthesis and the corrected partial image "1" used for synthesis are expressed by the spherical coordinate system while having a coordinate axis different from a coordinate axis used for the corrected partial image used for position detection by performing the above described rotational coordinate conversion.

Figure 18:
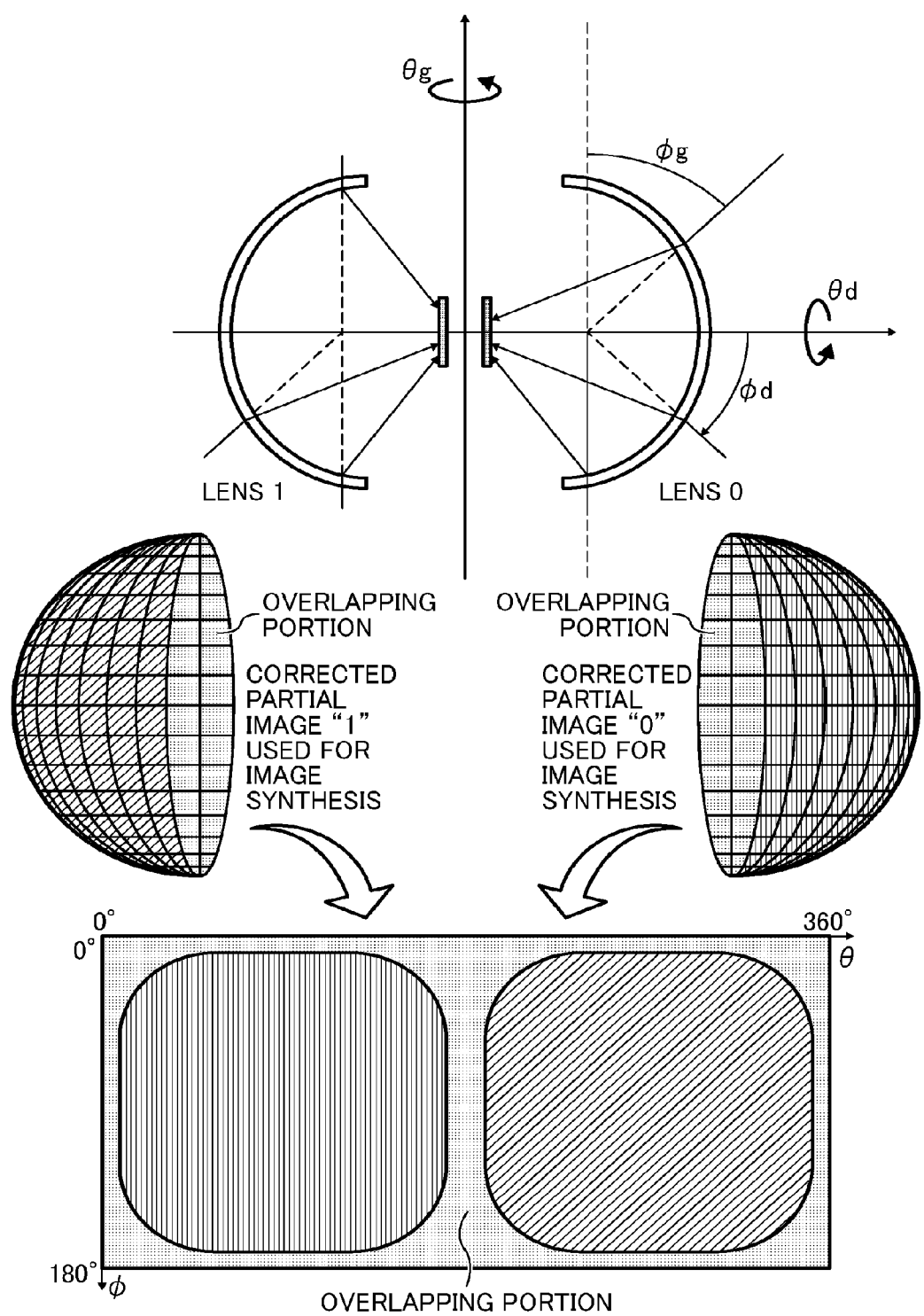
FIG. 18 illustrates an example of mapping two partial images captured by two fisheye lenses to a spherical coordinate system when performing an image synthesis processing of the second example embodiment.

FIG. 18 illustrates an example of mapping two partial images captured by the two fisheye lenses to the spherical coordinate system when performing the image synthesis processing of the second example embodiment. By performing the above described rotational coordinate conversion, the coordinate system can be converted from a coordinate system setting the optical axis of one lens optical unit as the coordinate axis for the horizontal angle and the vertical angle (FIG. 14) to a coordinate system setting an axis vertical to the optical axis as a reference axis for the horizontal angle and the vertical angle (FIG. 18). With this conversion, the two partial images "0" and "1" captured by the two fisheye lenses and corrected by the image-synthesis distortion correction unit 416 are loaded on the hemispherical image format as illustrated in FIG. 18. Typically, the partial image "0" captured by the fisheye lens 0 is mapped on the left-half hemisphere of the full hemisphere, and the partial image "1" captured by the fisheye lens 1 is mapped on the right-half hemisphere of the full hemisphere.

Compared to FIG. 14 that maps the hemispherical image format used for the position correction, FIG. 18 maps the partial image "0" and the partial image "1" expressed by the hemispherical image format and used for synthesis at different positions, in which the zenith direction of a scene matches the upper-lower direction of the image (φ direction), and a center portion of the partial image "0" and the partial image "1" are mapped on the equator having lesser distortion, and a peripheral portion (overlapping portion) of the corrected partial image "0" and the corrected partial image "1" are mapped near the vertical angle of 0 and 180 degrees, and near the horizontal angle of 0 and 180 degrees, which is different from the hemispherical image format of FIG. 14.

The image synthesis unit 418 synthesizes the corrected partial image "0" used for synthesis and the corrected partial image "1" used for synthesis to generate a synthesis image frame applied with the hemispherical image format.

A movie image compression unit 422 (movie image generator) receives a time series of images composed of a plurality of the synthesis image frames applied with the hemispherical photographed images. The movie image compression unit 422 performs the movie compression to the received time series of the synthesis image frames to generate movie image data, in which each of the synthesis image frames composing the movie image data can be referred to as a "discrete frame," and then the movie image compression unit 422 outputs movie data 440. The image synthesis unit 418 can be used as a synthesis unit that synthesizes or stitches images expressed by the spherical coordinate system of the second example embodiment.

As illustrated in FIG. 9, the image processing unit 400 can further include a display image generation unit 420. The synthesis image frames, generated by the above described processing, can be expressed by the hemispherical image format. Therefore, if the synthesis image frames expressed by the hemispherical image format is displayed on a flat display device such as a display, the displayed image distorts as closer to the vertical angle of 0 degree and 180 degrees.

The display image generation unit 420 performs image processing when projecting the hemispherical photographed image on the flat display device.

Specifically, the display image generation unit 420 sequentially converts the synthesis frame images of hemispherical image format from the spherical coordinate system to the planar coordinate system having a specific direction and a specific angle of view, with which images can be projected with a given angle of view in a specific field-of-vision direction designated by as user. With this processing, a viewer can view a movie image observed with a given view point and a given field of vision.

As shown in FIG. 9, the partial image "0" and the partial image "1" are input to a dot-lined section 450, and the stitching position information is output from the dot-lined section 450. The position-detection distortion correction unit 404 and the stitching position detector 406 are collectively used as 検出処理手段 detector of the second example embodiment.

Further, as shown in FIG. 9, the partial image "0" and the partial image "1" are input to a dot-lined section 460, and the corrected stitching position information is input to the dot-lined section 460 from the stitching position information correction unit 410, and the synthesis image such as the hemispherical photographed image is output from the dot-lined section 460. The table modification unit 412, the table generation unit 414, the image-synthesis distortion correction unit 416 and the image synthesis unit 418 are collectively used as an image synthesis processing unit of the second example embodiment.

Figure 10B:
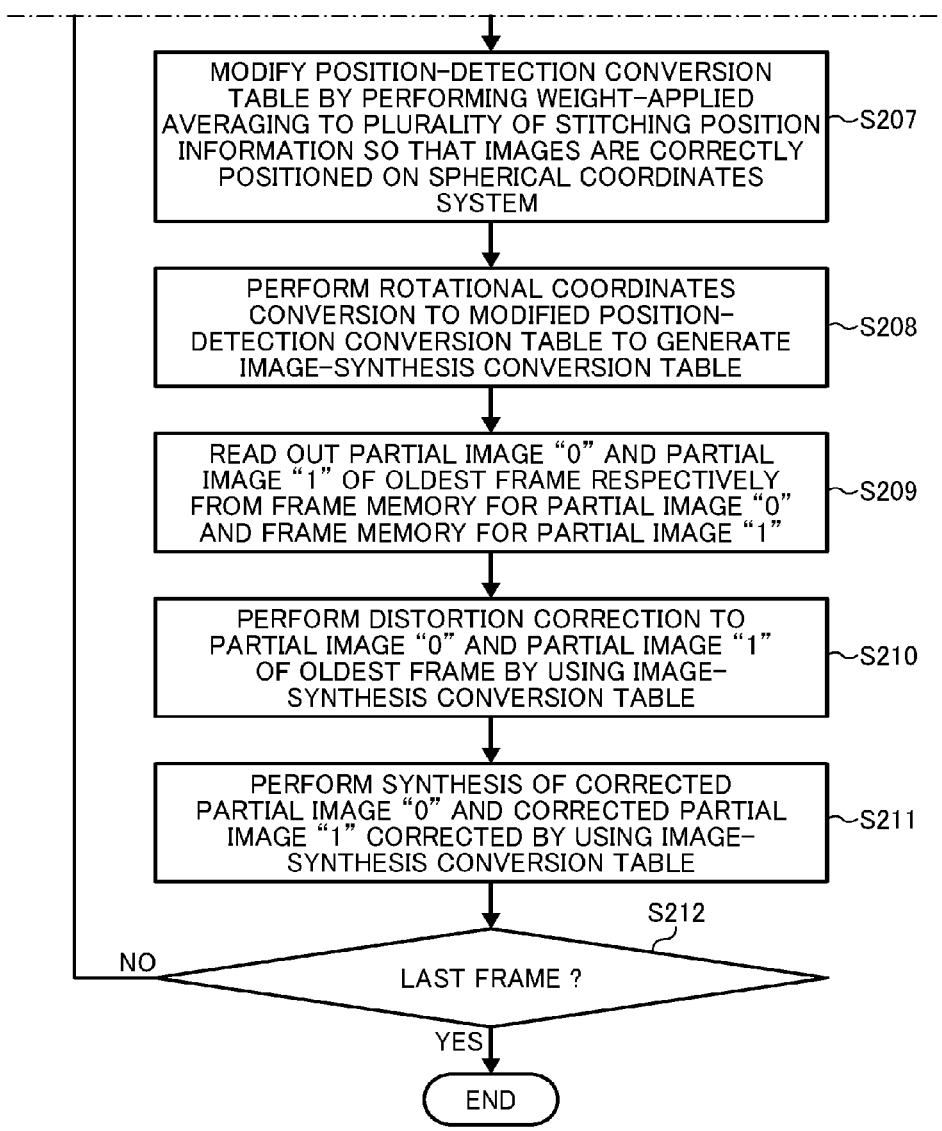

A description is given of a process of synthesizing the hemispherical movie image according to the second example embodiment with reference to FIGS. 10, 15, 16, and 17. FIG. 10 (10A/10B) is a flowchart showing the steps of synthesizing the hemispherical movie image performable by the hemispherical image capturing device 300. For example, the process of FIG. 10 can be started when the shutter button 306 is pressed and the CPU issues an image capture command.

At step S201, the hemispherical image capturing device 300 stores image data of the partial image "0" and the partial image "1" of the latest frame respectively in the frame memory 402a for partial image "0" and the frame memory 402b for partial image "1." If all of the storage areas of the frame memory 402 are already filled, the oldest frame is deleted from the frame memory 402. The storage areas of the frame memory 402 corresponds to the maximum number of frames that can be stored.

At step S202, the position-detection distortion correction unit 404 performs the distortion correction to the partial image "0" and the partial image "1," respectively acquired by the solid state image sensors 308a and 308b, by using the position-detection conversion table 430, with which a corrected partial image "0" used for position detection of hemispherical image format and a corrected partial image "1" used for position detection of hemispherical image format can be obtained as shown in FIG. 14.

At step S203, the stitching position detector 406 detects a stitching position in the overlapping portion of the partial image "0" used for position detection and the partial image "1" used for position detection in the latest frames, and generates stitching position information. For example, the stitching position detector 406 detects the stitching position by applying the template matching. In the template matching, one or more template images are extracted from the partial image "1" and corresponding one or more search-range images are extracted from the partial image "0." A position where a matching score of the template image and search-range image becomes the maximum and a given reference position are compared, and a deviation amount of the position from the given reference position is computed as the stitching position information.

Figure 15:
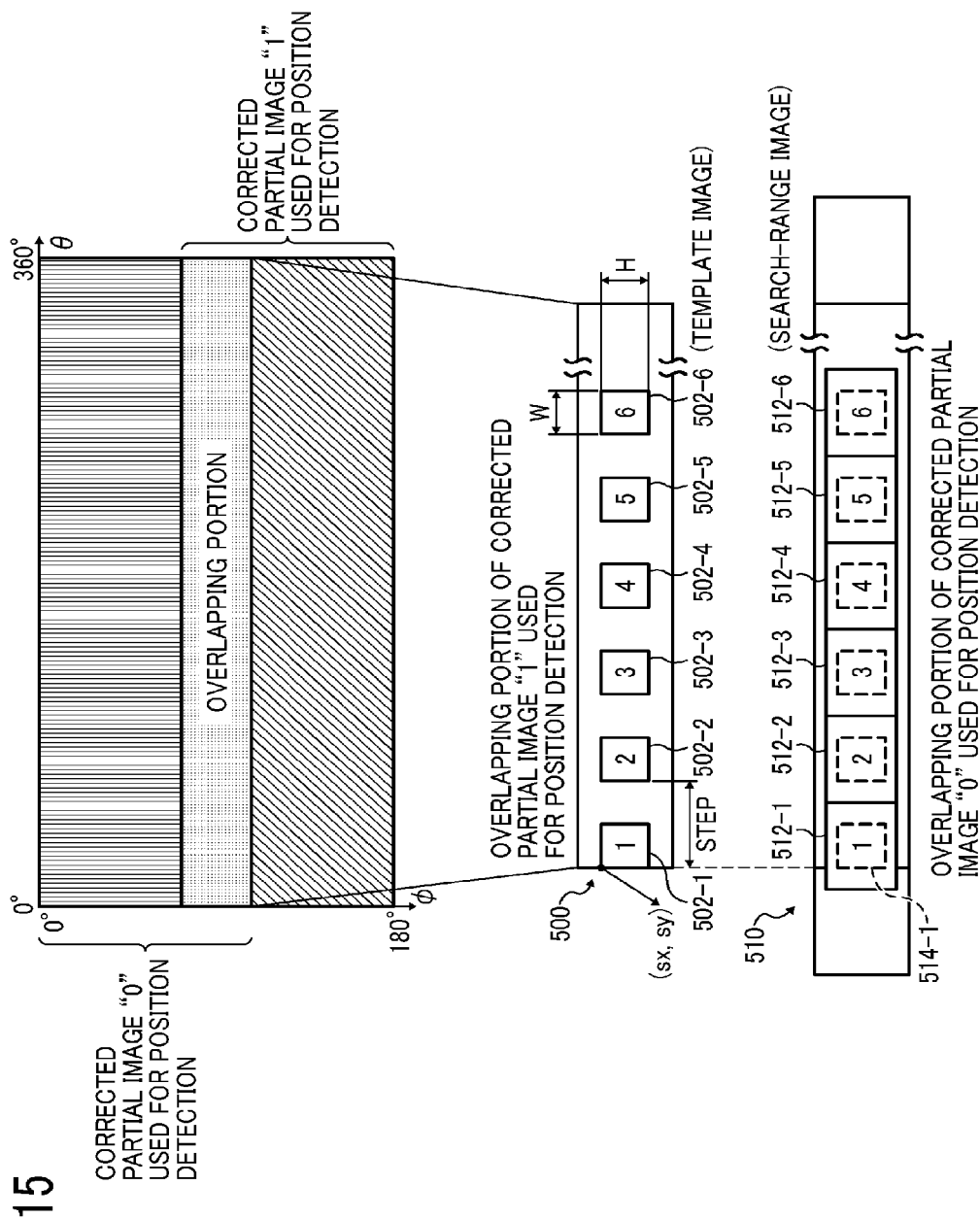
FIG. 15 schematically illustrates a process of generating template images and search-range images when performing a detection of the stitching position according to the second example embodiment.

FIG. 15 schematically illustrates a process of generating template images and search-range images when performing a detection of the stitching position according to the second example embodiment.

In the second example embodiment, a template image generation area 500 is in the overlapping portion "OP" of the corrected partial image "1" used for position detection, and a search-range image generation area 510 is in the overlapping portion "OP" of the corrected partial image "0" used for position detection.

In this configuration, a template image can be formed by setting a given block size (or pixel size), and a given interval between the adjacent template images as a generation interval of the template images. Further, a generation start coordinate that is the coordinates where the first template is extracted is set. The block size and generation interval can be determined based on a precision level desired for stitching and the processing load.

When the block size is set "W (pixel)×H (pixel)," the generation start coordinates is set as (sx, sy), and the generation interval is set as "step" (pixel), a plurality of template images 502-1 to 502-n (n=2, 3, . . . ) can be generated as shown in FIG. 15. The number "n" of the template images (or blocks) is a whole number obtained by dividing the horizontal direction size of the template image generation area 500 with the generation interval of "step," in which the horizontal direction size corresponds to a width size of hemispherical image format such as 3600 pixels.

An corresponding image area 514 corresponding to the generated plurality of the template images 502-1 to 502-n is searched in a given search range 512 in the search-range image generation area 510. The template matching can be performed by Zero-mean Normalized Cross-Correlation (ZNCC), Sum of Square Difference (SSD), Sum of Absolute Difference (SAD), Zero-mean Sum of Square Difference (ZSSD), Zero mean Sum of Absolute Difference (ZSAD), or Normalized Cross-Correlation (NCC), or any combinations of two or more of these.

Since the both ends of θ coordinates of hemispherical image format (i.e., 0 and 360 degrees) are connected or continued, when the template images are generated and the template matching is performed, one template image next to the right end can be processed as the left end template image, and one template image next to the left end can be processed as the right end template image.

At the above described step S203, a position where the matching score becomes the maximum is detected for each of the template images 502-1 to 502-n, and a deviation amount of the position having the maximum matching score with respect to the reference position is detected as the deviation amount.

At step S204, the hemispherical image capturing device 300 stores the stitching position information for each of the template images detected for the latest frame in the stitching position information memory 408. If all of the storage areas are already filled, the oldest stitching position information is deleted. The storage areas of the stitching position information memory 408 corresponds to the maximum number of frames that can be stored.

At step S205, the hemispherical image capturing device 300 determines whether all of the storage areas of the frame memories 402a and 402b are already filled. If it is determined that all of the storage area are not filled (S205: NO), the sequence loops to step S201, and the sequence waits an input of frame image data. By contrast, if it is determined that all of the storage area are already filled (S205: YES), the sequence proceeds to step S206.

At step S206, the hemispherical image capturing device 300 reads out the stitching position information detected at a plurality of time points for each of the template images from the stitching position information memory 408, and then the stitching position information correction unit 410 performs the weight-applied averaging to the stitching position information for each of the template images.

At step S207, the hemispherical image capturing device 300 modifies the position-detection conversion table 430 by using the corrected stitching position information for each of the template images, obtained at step S206 by performing the weight-applied averaging, to match a position of an image used for position-detection on the spherical coordinate system.

FIG. 16 is an example of a data structure of a corrected stitching position table including corrected stitching position for each of the pixels, which is generated before modifying the position-detection conversion table 430. As a process conducted before step S207, based on the corrected stitching position information for each of the template images, a table retaining the converted coordinates (θ, φ) and corresponding corrected deviation amount (Δθ, Δφ) for all of the coordinates (θ, φ) is generated as shown in FIG. 16. In this process, the corrected deviation amount (Δθi, Δφi) for each of template blocks (502-n), obtained by performing the above described stitching position detection and correction process, is set as the center coordinates of each of the template blocks, and the corrected stitching position can be computed by interpolating the corrected deviation amount (Δθ, Δφ) corresponding to each of coordinates (θ, φ). In the above description, the corrected stitching position for each of pixels are retained as a table format, but not limited hereto.

Figure 17A:
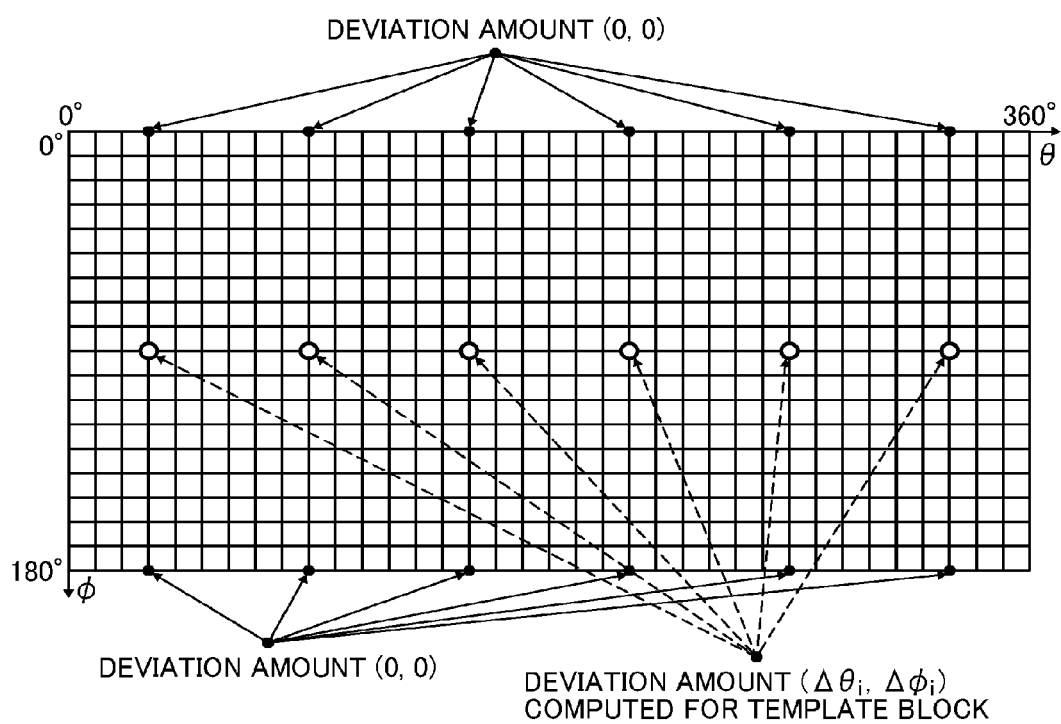
FIG. 17A and 17B schematically illustrates a process of generating a corrected stitching position table as a pre-process before modifying a position-detection conversion table according to the second example embodiment.
Figure 17B:
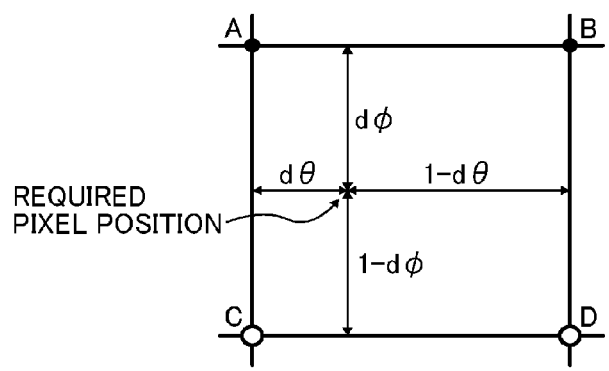

For example, as illustrated in FIG. 17A, the deviation amount (Δθi, Δφi) is set for each of the template blocks, and the deviation amount (0, 0) is set to coordinates having the angle "θ" equal to the center coordinates of the template block and positioned at the upper end (φ=0) or the lower end (φ=3599 when the width is 3600 pixels). As to other coordinates not set with the deviation amount, as illustrated in FIG. 17B, a lattice of four points A, B, C, D having set with the deviation amount and near to a target pixel (FIG. 17B) is assumed, and the deviation amount in the lattice is computed by performing a two dimensional linear interpolation.

In an example case of FIG. 17, the deviation amount (0, 0) is set at the upper end (φ=0) and the lower end (φ=3599) on the hemispherical image format, but not limited hereto. For example, some coordinates at the inner side (φ>0 and φ<3599) can be set with the deviation amount (0, 0), and then the two dimensional linear interpolation can be performed. In this case, all coordinates outside the some coordinates in φ direction can be set with the deviation amount (0, 0).

By performing the above described pre-process, as illustrated in FIG. 16, the deviation amount for each of coordinates using the hemispherical image format can be obtained. At step S207, as to the position-detection conversion table 430 used as a position-detection distortion correction table "0" for correcting the distortion of the partial image "0," the correction is conducted by corresponding coordinates (x, y) to the input coordinates (θ, φ), wherein the coordinates (x, y)

is corresponded to coordinates (θ+Δθ, φ+Δφ) before the modification. The position-detection conversion table 430 used as a position-detection distortion correction table "1" for correcting the distortion of the partial image "1" does not require the change of corresponding relationship of (x, y) and (θ, φ).

Referring back to FIG. 10, at step S208, the table generation unit 414 generates the image-synthesis conversion table 432 from the modified position-detection conversion table 430 by performing the rotational coordinate conversion. At step S209, the hemispherical image capturing device 300 reads out the partial image "0" and the partial image "1" of the oldest frame from the frame memory 402*a* and the frame memory 402*b*.

At step S210, the hemispherical image capturing device 300 performs the distortion correction to the partial image "0" and the partial image "1" of the oldest frame by using the image-synthesis conversion table 432, modified and generated based on the corrected stitching position information, to generate the corrected partial image "0" used for synthesis and the corrected partial image "1" used for synthesis.

Based on a process result by the image-synthesis distortion correction unit 416, the two partial images "0" and "1" captured by the fisheye lenses are loaded on the hemispherical image format as illustrated in FIG. 18. Since the image-synthesis conversion table 432 is generated based on the corrected stitching position information, the stitching correction is already performed to the corrected partial image "0" used for synthesis and the corrected partial image "1" used for synthesis at this stage, and thereby the corrected partial image "0" used for synthesis and the corrected partial image "1" used for synthesis can be stitched without further processing.

At step S211, the image synthesis unit 418 synthesizes the corrected partial image "0" used for synthesis and the corrected partial image "1" used for synthesis.

At step S212, the hemispherical image capturing device 300 determines whether the input frame is the last frame. If it is determined that the input frame is not the last frame (S212: NO), the sequence loops to step S201, and continues the image synthesis processing. By contrast, if no further frames is input, and it is determined that the input frame is the last frame (S212: YES), the image synthesis processing ends.

The time series of images composed of a plurality of the synthesis image frames of hemispherical photographed image, which are generated by the process of FIG. 10, are sequentially output to the movie image compression unit 422, and the movie image compression unit 422 performs movie compression to the plurality of the synthesis image frames, and outputs the synthesis image frames as movie data.

(Third Example Embodiment)

In the above described second example embodiment, the hemispherical image capturing device 300 is described as an example of the image processing system, image processing apparatus, and image capturing system, in which still or movie images of the full hemisphere are captured for a plurality of times by using the optical imaging system disposed in the hemispherical image capturing device 300, and the image processing unit 400 synthesizes a plurality of frame images as a movie image. However, configurations of the image processing apparatus, image processing system and image capturing system are not limited hereto.

For example, in another configuration, the image processing apparatus can be configured with a camera processor that generates hemispherical photographed image (movie image) upon receiving a plurality of partial images (movie image) captured by a plurality of optical imaging systems, and an information processing apparatus such as a personal computer, a work station, a virtual machine on a computer system, and a portable or mobile information apparatus such as smartphones, and tablets that can generate a hemispherical photographed image (movie image) upon receiving a plurality of partial images (movie image) captured by the hemispherical image capturing device.

Further, the image processing apparatus can be configured as the image capturing system configurable with one image processing apparatus (e.g., camera processor, information processing apparatus, portable or mobile information apparatus), and an optical imaging system disposed separately from the image processing apparatus. Further, the image processing system can be configured by distributing the above described functions to a plurality of computers.

Figure 19:
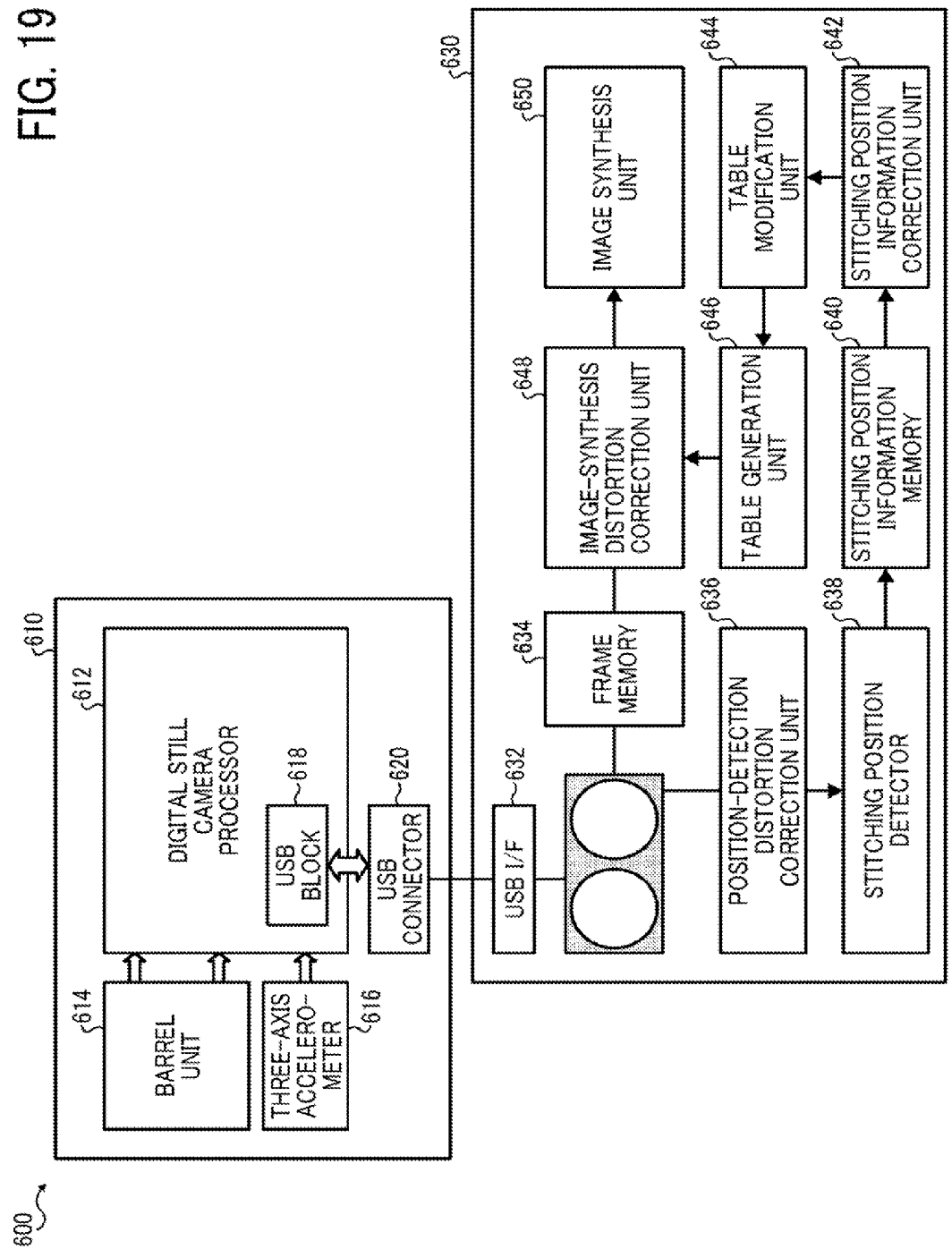
FIG. 19 is a schematic configuration of a hemispherical image capturing system according to a third example embodiment.

A description is given of a hemispherical image capturing system of the third example embodiment with reference to FIG. 19. The hemispherical image capturing system of the third example embodiment includes a hemispherical image capturing device, and an external computer device that generates a synthesized hemispherical movie image upon receiving a plurality of partial images captured by the hemispherical image capturing device. FIG. 19 is a schematic configuration of a hemispherical image capturing system 600 of the third example embodiment.

The hemispherical image capturing system 600 includes, for example, a hemispherical image capturing device 610, and a computing device 630 connectable with each other. The hemispherical image capturing device 610 captures images, and the computing device 630 performs image processing to the captured images. The hemispherical image capturing system 600 of FIG. 19 employs a configuration similar to the second example embodiment described with FIGS. 8 to 18 except that the computing device 630 performs the image processing such as synthesizing a hemispherical photographed image. Therefore, a description is given of the hemispherical image capturing system 600 for different points.

The hemispherical image capturing device 610 includes, for example, a digital still camera processor 612, a barrel unit 614, and a three-axis accelerometer 616 connected to the processor 612. The processor 612 includes, for example, a universal serial bus (USB) block 618 connected to a USB connector 620. The processor 612 controls USB communication via the USB block 618 and the USB connector 620.

The computing device 630 can employ a general purpose computer such as a desktop personal computer, and a work station. The computing device 630 includes hardware components such as a processor, a random access memory (RAM), a read only memory (ROM), and a storage memory such as a hard disk drive (HDD). The computing device 630 includes an USB interface 632 connectable with the hemispherical image capturing device 610 via a USB bus.

The computing device 630 further includes an image synthesis processing block including for example, a frame memory 634, a position-detection distortion correction unit 636, a stitching position detector 638, a stitching position information memory 640, a stitching position information correction unit 642, a table modification unit 644, a table generation unit 646, an image-synthesis distortion correction unit 648, and an image synthesis unit 650.

In the third example embodiment, movie data generated by synthesizing two partial images captured by a plurality of optical imaging systems of the barrel unit 614 (i e , planar image composed of two image circles that stitches the partial image "0" and the partial image "1" of the planar coordinate system) and a position-detection conversion table of the hemispherical image capturing device 610 are transferred to an external apparatus such as the computing device 630 via a USB bus.

In the computing device 630, the position-detection distortion correction unit 636 performs the distortion correction to the partial images "0" and "1" of each of the frames included in the movie data transferred from the hemispherical image capturing device 610 by using the transferred position-detection conversion table to generate the corrected partial image "0" used for position detection and the corrected partial image "1" used for position detection. The stitching position detector 638 (detection unit) detects the stitching position between the corrected partial image "0" and the corrected partial image "1" to generate stitching position information. The stitching position information memory 640 temporary stores the stitching position information detected at a plurality of time points by the stitching position detector 638. The stitching position information correction unit 642 performs the averaging process (i.e., smoothing) along the time line to the stitching position information detected at the plurality of time points and stored in the stitching position information memory 640. The table modification unit 644 modifies the transferred position-detection conversion table based on the smoothed stitching position information. The table generation unit 646 generates an image-synthesis conversion table by performing the rotational coordinate conversion to the modified position-detection conversion data.

The frame memory 634 temporary stores the partial images "0" and the partial images "1" of each of the frames composing the movie data transferred from the hemispherical image capturing device 610. The image-synthesis distortion correction unit 648 performs the distortion correction to the oldest original partial image "0" and the oldest original partial image "1" temporary stored in the frame memory 634 as a pre-process of the image synthesis processing by using the image-synthesis conversion table to generate the corrected partial image "0" used for synthesis and the corrected partial image "1" used for synthesis. The image synthesis unit 650 synthesizes the corrected partial image "0" used for synthesis and the corrected partial image "1" used for synthesis to generate a synthesis image of hemispherical image format.

As to the computing device 630, one or more programs can be read out from the ROM or HDD, and loaded to a working area of the RAM, and then the above described functions and various processing can be implemented under a control of the CPU.

FIG. 19 is an example configuration of the hemispherical image capturing system configured with separately disposed devices such as the image capturing device and the computing device disposed separately, but other configurations can be applied for the hemispherical image capturing system of FIG. 19. For example, each of the functions implemented in the hemispherical image capturing system can be implemented by distributing each of the functions in one or more image capturing apparatuses, and one or more computer systems.

In the above described image processing system, image processing apparatus, program, and image capturing system, a plurality of image sequences (e.g., first and second image sequences) can be captured, and each of the image sequences (e.g., first and second image sequences) can be composed of a plurality of partial images (e.g., first and second partial images). The partial images can be corrected based on positional relationship of the plurality of partial images at a plurality of time points, and then the corrected partial images can be synthesized or stitched. As to the second example embodiment, two partial images captured by the lens optical units having the angle of view greater than 180 degrees are stitched to generate the synthesis image, but not limited hereto. For example, three or more partial images captured by one or more lens optical units can be stitched to generate the synthesis image. Further, the second example embodiment is applied to the image capturing system employing the fisheye lens as one example, but not limited hereto. For example, the second example embodiment can be applied to the hemispherical image capturing system employing a super wide angle lens. In the above described second and third example embodiments, the stitching of hemispherical photographed image is described but not limited hereto. For example, the above described example embodiments can be applied to any image processing systems or apparatuses that can detect the stitching position of a plurality of partial images.

The present invention can be implemented in any convenient form, for example using dedicated hardware platform, or a mixture of dedicated hardware platform and software. Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions. Further, each of the functions of the described embodiments may be implemented by a programmable device (PD) such as a field programmable gate array (FPGA), or ASIC. The circuit configuration data (bit stream data) to be downloaded to the programmable device (PD) to implement the functions of the described embodiments, and data for generating the circuit configuration data such as data described by Hardware Description Language (HDL), Very High Speed Integrated Circuits Hardware Description Language (VHDL), and Verilog-HDL can be provided to the programmable device (PD) using any storage medium or carrier medium. Further, in some embodiments, any one of the information processing apparatus may include a plurality of computing devices, e.g., a server cluster, that are configured to communicate with each other over any type of communication links, including a network, a shared memory, etc. to collectively perform the processes disclosed herein.

The computer software can be provided to the programmable device using any storage medium or carrier medium such as non-volatile memory for storing processor-readable code such as a floppy disk, a flexible disk, a compact disk read only memory (CD-ROM), a compact disk rewritable (CD-RW), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a flash memory, Blu-ray disc (registered trademark), SD card, a solid state memory device or the like, but not limited these. Further, the computer software can be provided through communication lines such as electrical communication line. Further, the computer software can be provided in a read only memory (ROM) disposed for the computer. The computer software stored in the storage medium can be installed to the computer and executed to implement the above described processing. The computer software stored in the storage medium or apparatus of an external apparatus can be downloaded and installed to the computer via a network to implement the above described processing.

The hardware platform includes any desired kind of hardware resources including, for example, a central processing unit (CPU), a random access memory (RAM), and a hard disk drive (HDD). The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In the above-described example embodiment, a computer can be used with a computer-readable program, described by object-oriented programming languages such as C, C++, C#, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps. In the above-described embodiments, at least one or more of the units of apparatus can be implemented as hardware or as a combination of hardware/software combination. Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

Numerous additional modifications and variations for the communication terminal, information processing system, and information processing method, a program to execute the information processing method by a computer, and a storage or carrier medium of the program are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An image processing system, comprising:
an image receiver to receive a first image sequence composed of first partial images captured at a plurality of time points, and a second image sequence composed of second partial images captured at the plurality of time points, each one of the first partial images and each corresponding one of the second partial images being captured at substantially a same time point; and
processing circuitry to
detect a stitching position of each one of the first partial images and each corresponding one of the second partial images captured at substantially the same time point for the plurality of time points,
correct information of the stitching position at each time point of the plurality of time points based on information of the detected stitching position at the time point and at another time point of the plurality of time points, and
synthesize each one of the first partial images and each corresponding one of the second partial images captured at substantially the same time point based on the corrected stitching position information for the plurality of first and second partial images to generate a plurality of synthesis images.

2. The image processing system of claim 1, further comprising:
a first memory to temporary store at least one of the first partial images composing the first image sequence;
a second memory to temporary store at least one of the second partial images composing the second image sequence; and
a stitching position information memory to temporary store the detected stitching position information at the plurality of time points,
wherein the processing circuitry synthesizes a first partial image at a time point earlier than the latest time point, stored in the first memory, and a corresponding second partial image at the time point earlier than the latest time point, stored in the second memory, based on the corrected stitching position information detected at the plurality of time points.

3. The image processing system of claim 1, wherein the processing circuitry is further configured to generate movie image data based on the plurality of synthesized synthesis images.

4. The image processing system of claim 1, wherein the processing circuitry
detects a positional deviation amount of each of a plurality of object points in an overlapping portion of each one of the first partial images composing the first image sequence and each corresponding one of the second partial images composing the second image sequence, and
performs a weight-applied averaging along a time line to the positional deviation amount of each of the plurality of object points.

5. The image processing system of claim 1, further comprising:
a plurality of image capturing devices, each of the image capturing devices including a lens optical unit and a solid state image sensor that capture different directions to capture the first image sequence and the second image sequence, and having a disparity between the plurality of image capturing devices.

6. The image processing system of claim 5, wherein one of the plurality of image capturing devices has a first angle of view, and another one of the plurality of image capturing devices has a second angle of view, the plurality of image capturing devices combines the first angle of view and the second angle of view to cover a solid angle of $4\pi$ steradian, and the processing circuitry synthesizes the plurality of first and second partial images to generate the plurality of synthesis images as hemispherical photographed images.

7. The image processing system of claim 6, further comprising:
   an image capturing apparatus including the plurality of image capturing devices,
   wherein the image capturing apparatus outputs image data including the first image sequence and the second image sequence supplied from the plurality of image capturing devices; and
   the image processing apparatus includes the image receiver and the processing circuitry, and the image processing apparatus receives the image data output from the image capturing apparatus.

8. The image processing system of claim 5, wherein
   the processing circuitry includes a position-detection conversion table used for converting partial images expressed by a planar coordinate system captured by the plurality of image capturing devices to partial images expressed by a spherical coordinate system; and
   the processing circuitry is further configured to
      modify the position-detection conversion table based on the corrected stitching position information;
      convert each one of the first partial images composing the first image sequence and each one of the second partial images composing the second image sequence to the first partial images expressed by the spherical coordinate system and the second partial images expressed by the spherical coordinate system based on the modified position-detection conversion table; and
      synthesize each one of the first partial images of the first image sequence converted to the spherical coordinate system and each corresponding one of the second partial images of the second image sequence converted to the spherical coordinate system by stitching each one of the first partial images and each corresponding one of the second partial images for the plurality of first and second partial images.

9. The image processing system of claim 8, wherein the processing circuitry is further configured to
   apply the position-detection conversion table to convert the first partial images of the first image sequence and the second partial images of the second image sequence to the first partial images and the second partial images expressed by the spherical coordinates system,
   detect a stitching position of each one of the first partial images of the first image sequence converted to the spherical coordinate system and each corresponding one of the second partial images of the second image sequence converted to the spherical coordinate system,
   generate an image-synthesis conversion table by applying a rotational coordinate conversion to the modified position-detection conversion table, and
   apply the image-synthesis conversion table, generated from the modified position-detection conversion table, to convert the first partial images of the first image sequence used for position detection and the second partial images of the second image sequence used for position detection to the first partial images of the first image sequence used for synthesis and the second partial images of the second image sequence used for synthesis.

10. The image processing system of claim 1, wherein the processing circuitry is further configured to correct the information of the stitching position at each time point by performing a weighted average of the detected switching position at the time point and the another time point.

11. The image processing system of claim 1, wherein the processing circuitry is configured to correct the information of the stitching position at each time point based on the information of the detected stitching position at the time point and the another time point, wherein the another time point is prior to the time point.

12. An image processing apparatus, comprising:
   an image receiver to receive a first image sequence composed of first partial images captured at a plurality of time points, and a second image sequence composed of second partial images captured at the plurality of time points, each one of the first partial images and each corresponding one of the second partial images being captured at substantially a same time point; and
   processing circuitry to
      detect a stitching position of each one of the first partial images and each corresponding one of the second partial images captured at substantially the same time point for the plurality of time points,
      correct information of the stitching position at each time point of the plurality of time points based on information of the detected stitching position at the time point and at another time point of the plurality of time points, and
      synthesize each one of the first partial images and each corresponding one of the second partial images captured at substantially the same time point based on the corrected stitching position information for the plurality of first and second partial images to generate a plurality of synthesis images.

13. An image processing system, comprising:
   processing circuitry to
      detect a stitching position of each one of first partial images composing a first image sequence and each corresponding one of second partial images composing a second image sequence captured at substantially a same time point for a plurality of time points,
      correct the stitching position of each time point of the plurality of time points based on information of the detected stitching position at the time point and at another time point of the plurality of time points, and
      synthesize each one of the first partial images composing the first image sequence and each corresponding one of the second partial images composing the second image sequence based on the corrected stitching position information for the plurality of first and second partial images to generate a plurality of synthesis images.

* * * * *